United States Patent [19]

Kumagai

[11] 4,191,242

[45] Mar. 4, 1980

[54] AIR CONDITIONER OPERATING APPARATUS

[75] Inventor: Naotake Kumagai, Aichi, Japan

[73] Assignee: Mitsubishi Jidosha Kogyo Kabushiki Kaisha, Japan

[21] Appl. No.: 884,164

[22] Filed: Mar. 7, 1978

[30] Foreign Application Priority Data

Mar. 28, 1977 [JP] Japan .................. 52/38149[U]
Jan. 24, 1978 [JP] Japan .................. 53/7108

[51] Int. Cl.² .............. B60H 1/00; B60Q 11/00; G08B 5/36
[52] U.S. Cl. .................. 165/11; 73/432 AD; 165/43; 237/12.3 B; 340/52 F; 340/525
[58] Field of Search ............ 165/11, 42, 43; 62/126; 236/94; 340/52 F, 79, 286 M, 524, 525; 73/432 AD; 123/41.15; 237/12.3 B

[56] References Cited

U.S. PATENT DOCUMENTS

| | | | |
|---|---|---|---|
| 3,626,370 | 12/1971 | Stubbs | 340/524 X |
| 3,939,456 | 2/1976 | Curtis | 236/94 X |
| 4,016,534 | 4/1977 | Kobayashi et al. | 340/52 F |
| 4,025,896 | 5/1977 | Hintze et al. | 340/79 X |
| 4,035,764 | 7/1977 | Fujinami et al. | 340/52 F |
| 4,038,061 | 7/1977 | Anderson et al. | 62/126 |
| 4,109,235 | 8/1978 | Bouthors | 340/52 F |

*Primary Examiner*—Albert W. Davis, Jr.
*Assistant Examiner*—Margaret A. Focarina
*Attorney, Agent, or Firm*—Robert E. Burns; Emmanuel J. Lobato; Bruce L. Adams

[57] ABSTRACT

An automobile air conditioner operating apparatus having an operating panel on which sketches of the automobile body and indications are drawn, wherein the operation of control switches on the operating panel makes projections of arrows on the panel in the position of each sketch and indication corresponding to the operated control switch. The arrows illuminated by lamps emit in warm-color, cool-color or their mixed-color interlockingly with the detailed operation of the switches, so that any driver can easily operate the air conditioner, perceiving the conditions of the air flow into or out of the air conditioner proper.

32 Claims, 30 Drawing Figures

F I G. 22
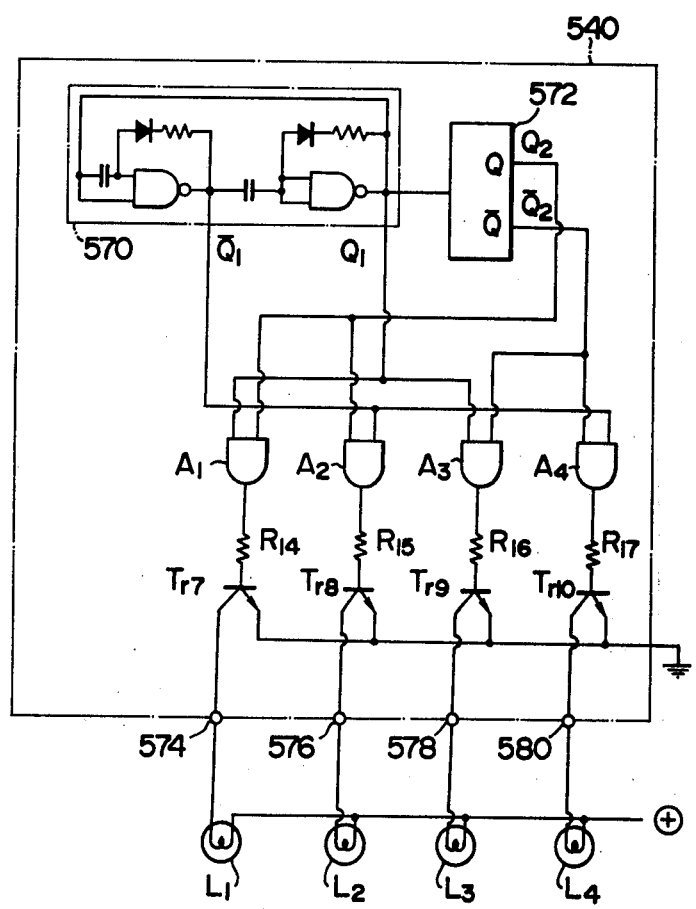

AIR CONDITIONER OPERATING APPARATUS

BACKGROUND OF THE INVENTION

This invention relates to apparatus for operating an air conditioner or, in particular, an automotive air conditioner.

With conventional automotive air conditioners, introduction of external air from outside and recirculation of air inside the cabin are achieved by selecting suitable air intake ports. Similarly, defrosting of the front window and air discharge at the driver's face and foot levels are done by selecting suitable air outlet ducts. In practically all cases, such selections have been made by the driver himself who controls such control means as selection levers and fan switches.

This distracts the attention of the driver. Especially when the driver is inexperienced, operation of such air conditioner operating apparatus entails unstable driving and greater hazards of causing accidents.

On a panel carrying said selection levers and other control means, they have been represented by "DEF," "VENT," "HEAT," and other letters. As these letters have been difficult to understand at a glance, however, it has been necessary to memorize their meanings by reading an instruction manual comprising not a few pages.

SUMMARY OF THE INVENTION

The object of this invention is to eliminate the aforesaid shortcomings and, more particularly, to provide air conditioner operating apparatus comprising an automotive air conditioner, which comprises such component elements as are composed of at least a plurality each of air intake ducts and air outlet ducts, an operating panel on which, at least, is drawn a sketch that corresponds to the cabin in which said air conditioner is mounted, a plurality of means for indicating the air flowing in and out of said air conditioner that are provided in a plurality of corresponding positions on said sketch. Control means are adapted to permit shifting of the position thereof between said plurality of indicating means, and operating means actuated through interlocking means by the control means are provided to control the component elements.

BRIEF DESCRIPTION OF THE DRAWINGS

Now some embodiments of this invention will be described by reference to the accompanying drawings.

FIG. 22 is a diagram showing a flicker device shown in FIG. 21.

DESCRIPTION OF THE PREFERRED EMBODIMENT

Figure 1:
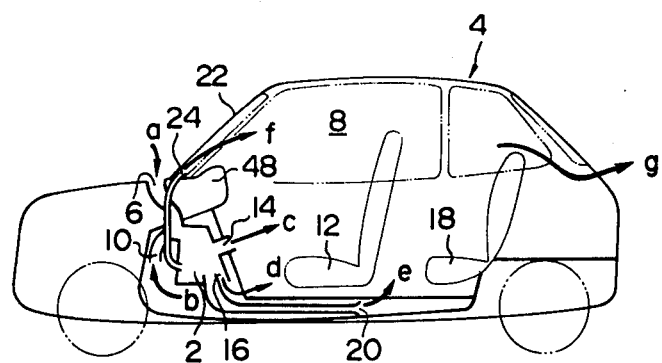
FIG. 1 is a schematic cross-sectional view of an automobile to which an embodiment of this invention is applied.
Figure 2:
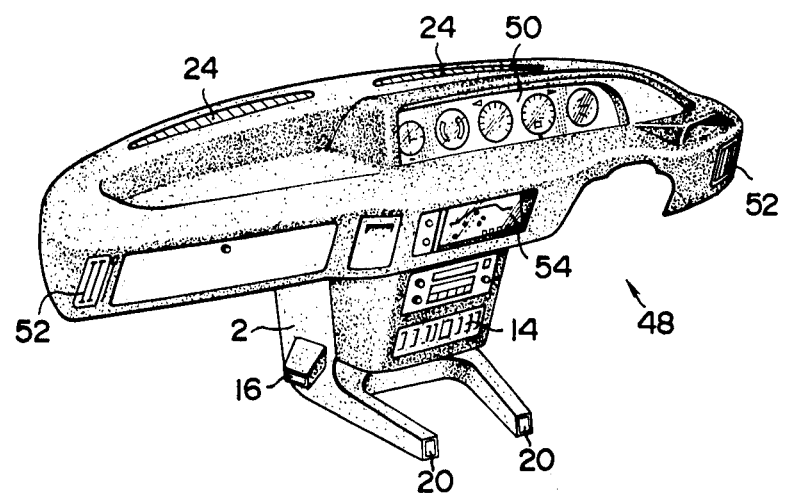
FIG. 2 is a schematic perspective view of an instrument panel of the first embodiment of this invention.

A first embodiment of this invention will be described by reference to FIGS. 1 through 14 and Tables 1 and 2. In FIGS. 1, 2 and 8, reference numeral 2 designates an air conditioner proper mounted in an automobile 4, which comprises an external air intake duct 6 that introduces fresh air from outside as indicated by the arrow "a". An internal air intake duct 10 introduces air inside the cabin 8 into the air conditioner proper 2 as indicated by the arrow "b" for recirculation in the cabin 8. A "VENT" outlet duct 14 discharges air against the face of the driver and other passenger sitting in the front seat 12 as indicated by the arrow "c". A "HEAT" outlet duct 16 that discharges air against the feet of said passengers as indicated by the arrow "d" and a "HEAT/R" outlet duct 20 that discharges air against the feet of passengers sitting in the rear seat 18 as indicated by the arrow "e". A "DEF" outlet duct 24 that discharges air against the internal surface of a front window 22 as indicated by the arrow "f". A fan 28 is provided in an air passage 26 connecting the external air intake duct 6 and internal air intake duct 10 with the outlet duct 14, 16 and 20. A heater core 30 is provided in the air passage 26 and a cooler core 32 is provided in the internal air intake duct 10, and other component elements.

The external air intake duct 6 and internal air intake duct 10 are switched by an air change-over damper valve 34. The "VENT" outlet duct 14, "HEAT" outlet duct 16 and "HEAT/R" outlet duct 20, and "DEF" outlet duct 24 are switched by a "VENT" damper valve 36 provided in the "VENT" outlet duct 14. A "HEAT" damper valve 38 is provided in the "HEAT" and "HEAT/R" outlet duct 16 and 20, and a "DEF" damper valve 40 is provided in the "DEF" outlet duct 24, respectively. The fan 28 is driven by a fan motor 42. The temperature of said heater core 30 is controlled by a regulating valve 44 that regulates the flow rate of hot water. The temperature of the cooler core 32 is controlled by a regulating valve 46 that regulates the flow rate of refrigerant. The damper valves, fan motor 42, and regulating valves 44 and 46 make up means for operating said component elements.

Figure 4:
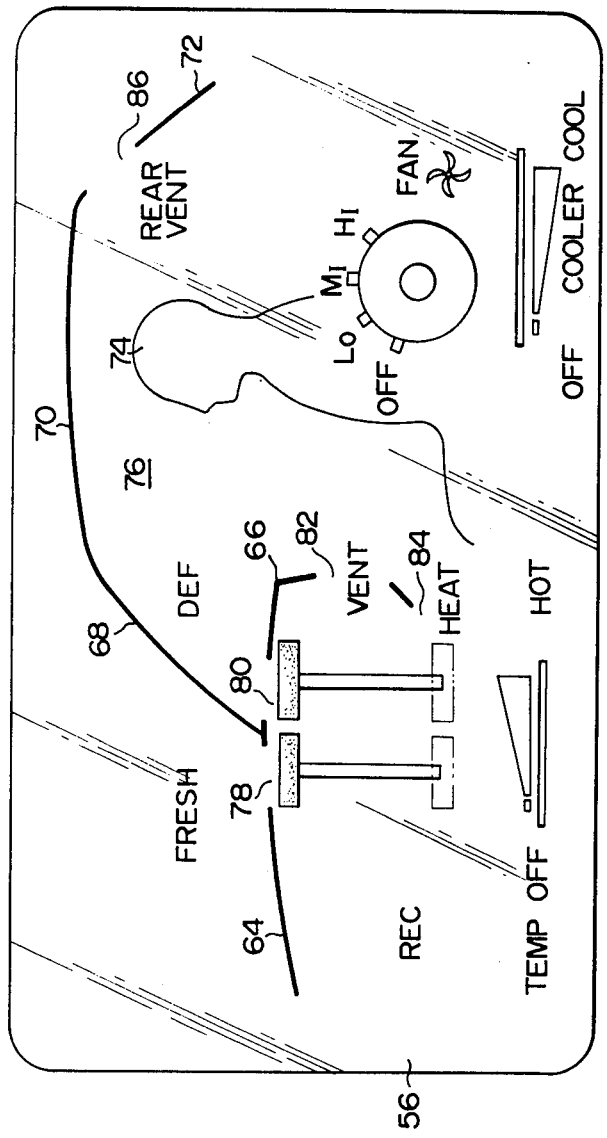
FIG. 4 is a schematic view of a transparent plate of the operating panel of FIG. 3.

An instrument panel 48 is disposed in the front portion of the cabin 8 and comprises a meter cluster 50 containing various meters, a side ventilator 52, said "DEF" outlet duct 24, said "VENT" outlet duct 14, and an operating panel 54 of the air conditioner 2 proper. The operating panel 54 is provided in such portion of the instrument panel 48 that substantially corresponds to the center of the car body so that the driver can see and operate with ease. The operating panel 54 comprises a transparent plate 56 of glass, acrylic resin, etc., a semi-transparent smoked panel 58 of glass, acrylic resin, etc., an opaque shielding plate 60 of metal, plastic, etc., and a base plate 62 carrying electric lamps and so on, from the surface in that order. On the back side of the transparent plate 56 is drawn a sketch of the automobile profile comprising a front bonnet 64, instrument panel 66, front window 68, roof 70 and rear window 72, as shown in FIG. 4. This sketch shows a passenger 74 too, and clearly shows the interior arrangement of a cabin 76. In the said front bonnet 64 is provided a break 78 designating a port through which external air is introduced, with letter "FRESH" is thereabove. Letters "REC" in the cabin 76 indicate the introduction and recirculation of internal air. A break 80 designating a port to send air along the internal surface of the front window 68 is provided above the instrument panel 66, together with letters "DEF." A break 82 designating a port to send air against the face of the passenger 74 is provided in the center of the instrument panel 66, together with letters "VENT." Below the instrument panel 66 is provided a break 84 designating a port to send air against the feet of the passenger 74, together with letters "HEAT." And a break 86 designating a port to discharge the internal air in the cabin outside is given in the rear window 72, together with letters "REAR VENT." These indications and letters made up display means corresponding to the component elements of the air conditioner proper 2. Reference numeral 88 denotes an air change-over lever slidable between the letters "FRESH" and "REC," 90 an outlet duct selection lever is disposed slidable between said letters "DEF," "VENT," and "HEAT," 92 a warm air control lever is slidable between letters "OFF" and "HOT." A cool air control lever 94 is slidable between letters "OFF" and "COOL," and a fan switch 96 controls the speed of the fan at positions "OFF," "LO," "MI," and "HI." The levers and fan switch make up control means.

Figure 5:
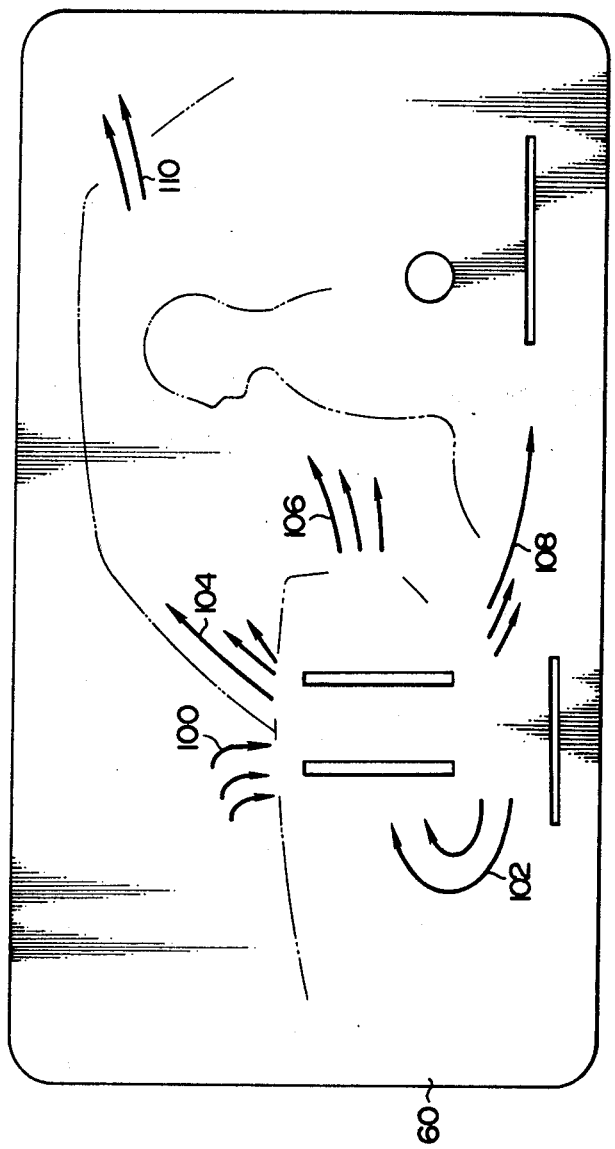
FIG. 5 is a schematic view of a shielding plate of the operating panel of FIG. 3.

The shielding plate 60 of the operating panel 54 will be described by reference to FIG. 5. Reference 100 designates a plurality of arrow-shaped openings made in the vicinity of the letters "FRESH," designates a plurality of arrow-shaped openings made in the vicinity of said letters "REC". A plurality of arrow-shaped openings 104 made in the vicinity of the letters "DEF," 106 a plurality of arrow-shaped openings are disposed in the vicinity of said letters "VENT." A plurality of arrow-shaped openings 108 made in the vicinity of said letters "HEAT," and reference designates a plurality of arrow-shaped openings made in the vicinity of the letters "REAR VENT."

Figure 6:
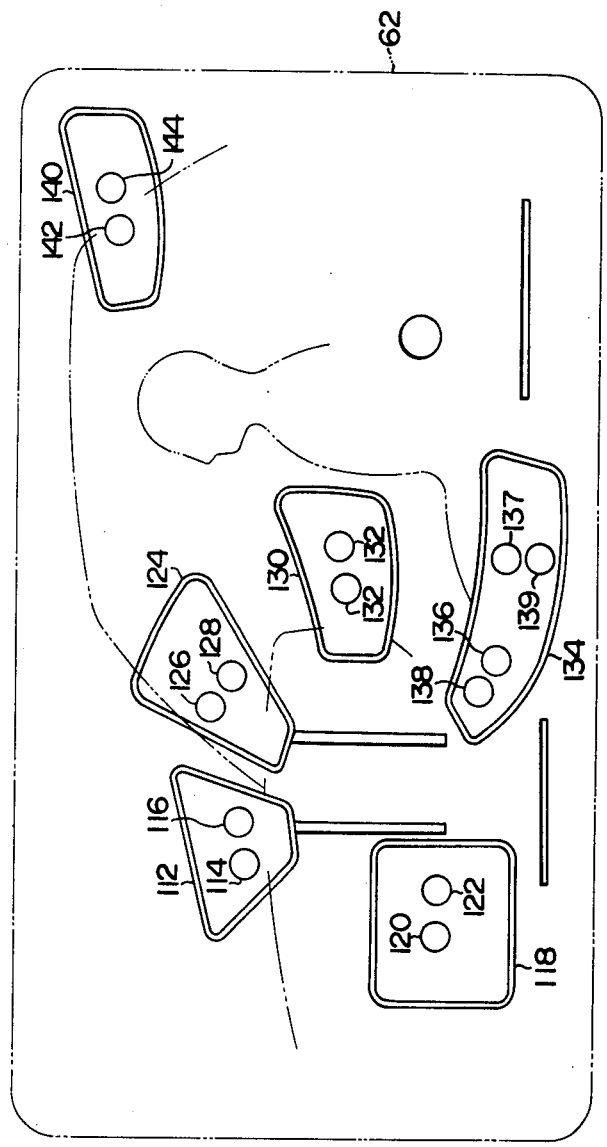
FIG. 6 is a schematic view of a base plate of the operating panel of FIG. 3.

Next, the base plate 62 of the operating panel 54 will be described by reference to FIG. 6. A partition 112 encloses the openings 100 in the vicinity of the letters "FRESH" and a red lamp 114 and a blue lamp 116. A partition 118 encloses the openings 102 in the vicinity of the letters "REC" and a red lamp 120 and a blue lamp 122. A partition encloses the openings 104 in the vicinity of the letters "DEF" and a red lamp 126 and a blue lamp 128. A partition 130 encloses the openings 106 in the vicinity of the letters "VENT" and blue lamps 132. A partition 134 encloses the openings 108 in the vicinity of the letters "HEAT" and red lamps 136 and 137 and blue lamps 138 and 139, and 140 is a partitiion enclosing the openings 110 in the vicinity of the letters "REAR VENT" and a red lamp 142 and a blue lamp 144.

Light emitted by the red or blue lamps passes through the arrow-shaped openings 100, 102, 104, 106, 108 and 110 and the smoked panel 58 and projects "FRESH" indicating arrows 101 in the vicinity of the letters "FRESH," "REC" indicating arrows 103 in the vicinity of the letters "REC," "DEF" indicating arrows 105 in the vicinity of the letters "DEF," "VENT" indicating arrows 107 in the vicinity of the letters "VENT," "HEAT" indicating arrows 109 in the vicinity of the letters "HEAT," and "REAR VENT" indicating arrows 111 in the vicinity of the letters "REAR VENT," respectively, on said transparent plate 56, in red or blue depending on the color of the lamp lighted.

Figure 3:
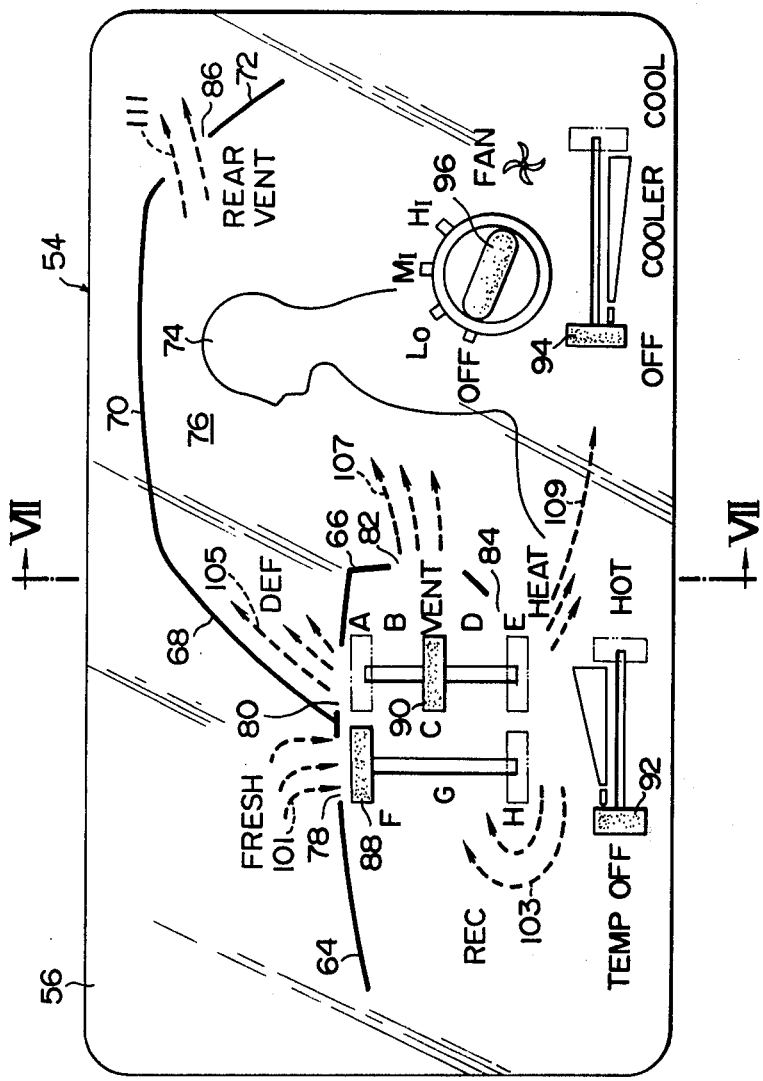
FIG. 3 is a schematic view of an operating panel shown in FIG. 2.
Figure 7:
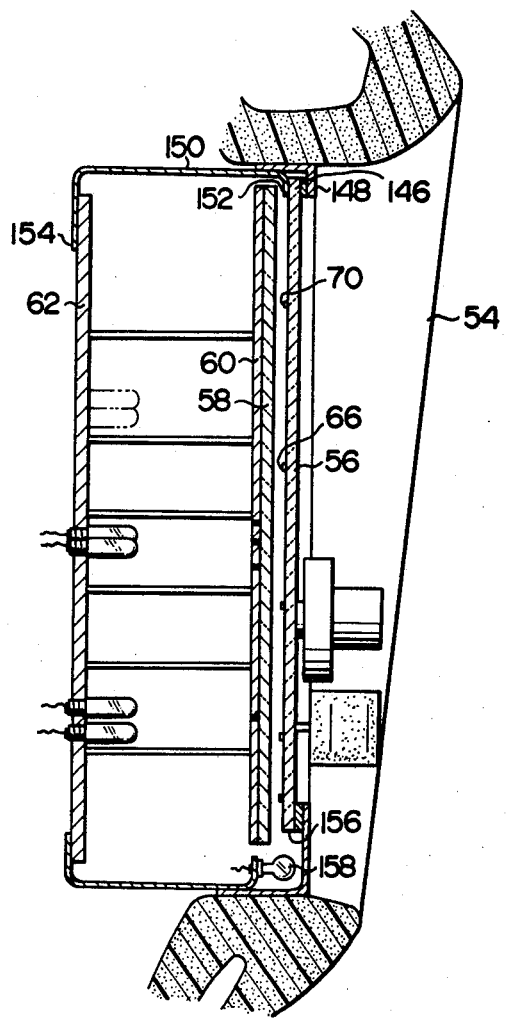
FIG. 7 is a schematic cross-sectional view of the operating panel taken along the line VII—VII of FIG. 3.
Figure 8:
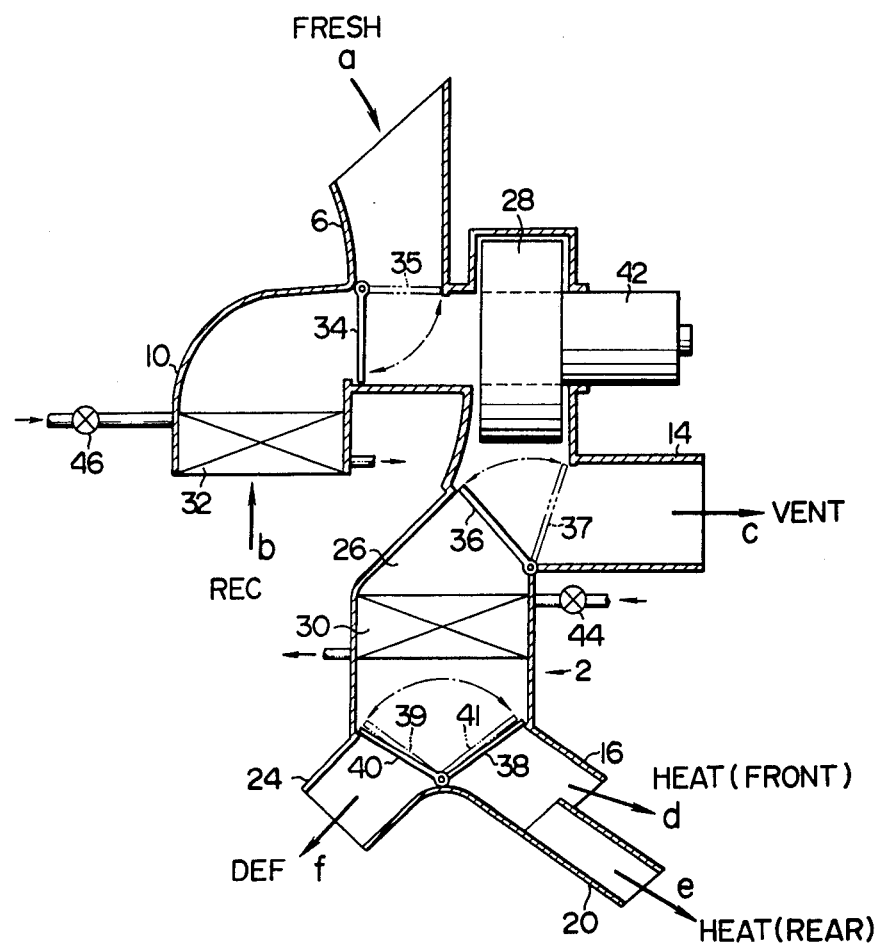
FIG. 8 is a view illustrating the construction of the first embodiment of this invention.
Figure 9:
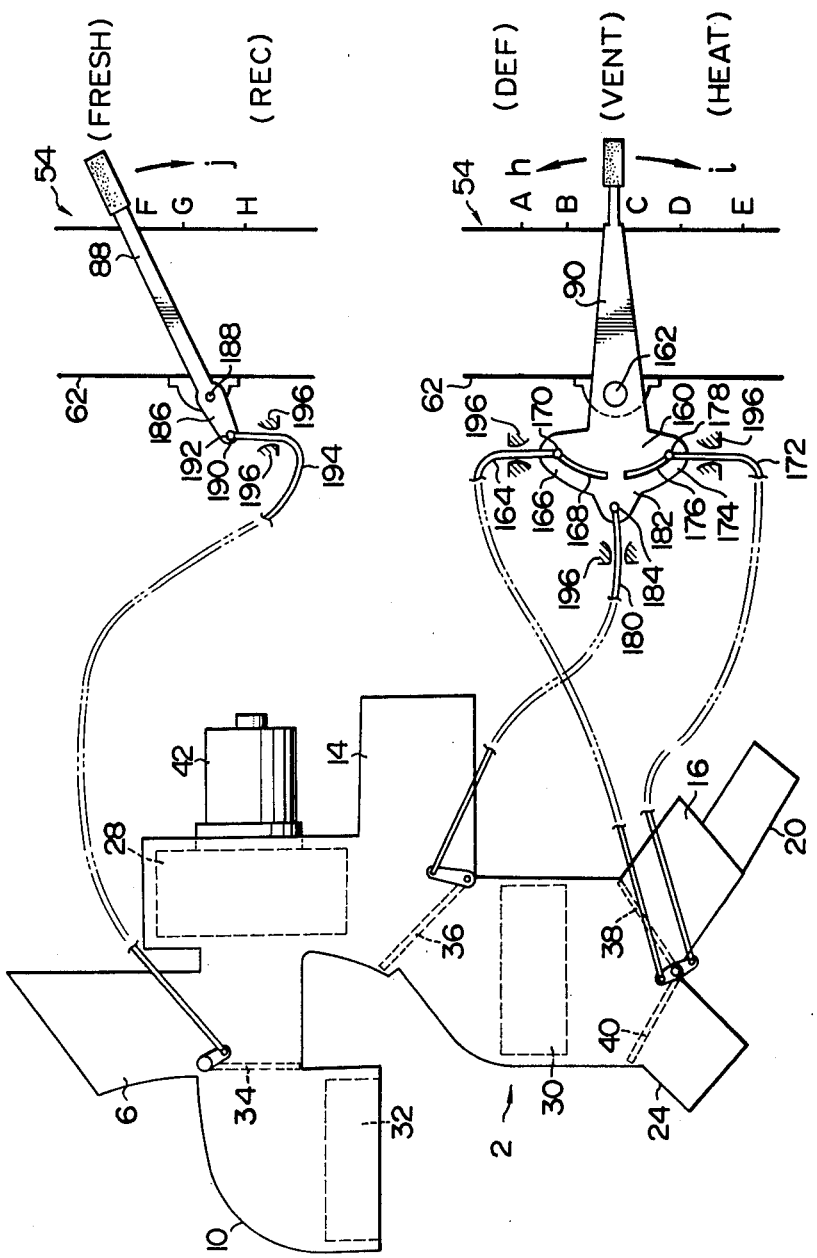
FIG. 9 is a view illustrating control means of the first embodiment of this invention.

The transparent plate 56, smoked panel 58, shielding plate 60 and base plate 62 of the operating panel 54 are assembled as shown in the cross-sectional view of FIG. 7, which is taken along the line VII—VII of FIG. 3. An edge 146 of the transparent plate 56 is held between an outer frame 148 and one end 152 of an inner frame 150. The other end 154 of said inner frame 150 is fixed to the base plate 62. The smoked panel 58 and the shielding plate 60 are integrally fitted together, and fixed to the base plate 62 through the partitions. A lamp 158 is provided in the vicinity of or in contact with an edge 156 of the transparent plate 56, so that the transparent plate 56 is illuminated by lighting the lamp 158.

Control means, such as the levers and fan switch, provided on the operating panel 54 actuate the dampers, flow rate regulating valves, fan motor and other operating means and select such component elements as the air intake ducts and air outlet ducts by way of such interlocking means as known wires, links, rods or electric circuits. By reference to FIGS. 8 and 9, an embodiment of the control, interlocking and operating means will be described. Reference 160 designates a link plate of an outlet duct selection lever 90 on the operating panel 54, which is pivotally fitted to the base plate 62 of the operating panel 54 with a pin 162.

Reference numeral 164 designates an operating cable slidably engaged, through a slide pin 170, in an arcuate groove 168 in a first end 166 of the three-pronged link plate 160 and connected to the "DEF" damper valve 40 of the air conditioner proper 2. When the outlet duct selection lever 90 turns in the direction of the arrow "h" or toward the letters "DEF" to pull the operating cable 164, the "DEF" damper valve 40 turns to a position indicated by a two-dot-dash line 41 in FIG. 8 to open the "DEF" outlet duct 24. Reference numeral 172 denotes an operating cable slidably engaged, through a slide pin 178, in an arcuate groove 176 in a second end 174 of the link plate 160 and connected to the "HEAT" damper valve 38 of the air conditioner proper 2. When the outlet duct selection lever 90 turns in the direction of the arrow "i" or toward the letters "HEAT" to pull the operating cable 172, the "HEAT" damper valve 38 turns to a position indicated by a two-dot-dash line 39 to open the "HEAT" outlet duct 16 and the "HEAT/R" outlet duct 20. At this time, the operating cable 164 engaged in the arcuate groove 168 in the first end 166 is freed of tension, as the slide pin 170 slides in the arcuate groove 168. Accordingly, the "DEF" damper valve 40 is held in a position indicated by a solid line by a spring or other suitable means. Likewise, when the outlet duct selection lever 90 is turned in the direction of the arrow "h" or toward the letters "DEF," the "HEAT" damper valve 38 remains unturned and held in a position indicated by a solid line by a spring or other suitable means.

Item 180 is an operating cable attached to a third end 182 of the link plate 160 via a pin 184 and connected to the "VENT" damper valve 36 of the air conditioner proper 2. In "VENT" position shown in FIG. 9, the operating cable 180 is freed of tension, and the "VENT" damper valve 36 is held in a position indicated by a solid line in FIG. 8 by a spring or other suitable means. When the outlet duct selection lever 90 is turned in the direction indicated by the arrow "h" or "i" or toward the letters "DEF" or "HEAT," said operating cable is pulled and the "VENT" damper valve 36 gradually turns to position indicated by a two-dot-dash line 37 to slowly close the "VENT" outlet duct 14.

The link plate 160 is so formed as to impart suitable contact force to the base plate 62 and so on to offset the urging force of the spring or other means, not shown, for holding said damper valves 36, 38 and 40, so that the link plate 160 is positioned and held by the resulting frictional force.

Reference numeral 186 denotes a link plate formed at one end of the air change-over lever 88 on the operating panel 54, which is pivotally fitted through a pin 188 to the base plate 62 of the operating panel 54 and connected to the air change-over damper valve 34 of the air conditioner proper 2 by an operating cable 194 attached to a suitable end 190 thereof via a pin 192.

When the air change-over lever 88 is in a position indicated by a solid line or in "FRESH" position, the operating cable 194 is freed of tension and the air change-over damper valve 34 is held in a position indicated by a solid line. On turning the air change-over lever 88 in the direction indicated by the arrow "J" or toward the letters "REC," the operating cable 194 is pulled and, thereby, the air change-over damper valve 34 gradually turns to a position indicated by a two-dot-dash line 35.

The operating cables are of known type, comprising an inner member of flexible wire and an outer member of flexible tube. The outer members are fixed to the car body, operating panel 54 or other suitable place by use of stopper members or guide members 196.

As the control and operating means are constructed as described above, when the outlet duct selection lever 90 is set in "DEF" position A, the "VENT" damper valve 36 close the "VENT" outlet duct 14, the "HEAT" damper valve 38 closes the "HEAT" outlet duct 16, and the "DEF" damper valve 40 opens the "DEF" outlet duct 24, so that air flows out only from the "DEF" outlet duct 24.

When the outlet duct selection lever 90 is set in "VENT" position C, the "VENT" damper valve 36 opens the "VENT" outlet duct 14 and closes the air passage 26, the "HEAT" damper valve 38 closes the "HEAT" outlet duct 16, and the "DEF" damper valve 40 closes the "DEF" outlet duct 24, so that air flows out only from the "VENT" outlet duct.

When the outlet duct selection lever 90 is set in "HEAT" position E, the "VENT" damper valve 36 closes the "VENT" outlet duct, the "HEAT" damper valve 38 opens the "HEAT" outlet duct 16 and "HEAT/R" outlet duct 20, and the "DEF" damper valve 40 closes the "DEF" outlet duct 24, so that air flows out only from the "HEAT" outlet duct 16 and "HEAT/R" outlet duct 20.

When the outlet duct selection lever 90 is set in an intermediate position B between "DEF" position A and "VENT" position C, the "VENT" damper valve 36 partially opens the "VENT" outlet duct 14 and the "DEF" damper valve 40 also partially opens the "DEF" outlet duct 24, so that air flows out from both the "VENT" outlet duct 14 and "DEF" outlet duct 24.

When the discharge port selection lever 90 is set in an intermediate position D between "VENT" position C and "HEAT" position E, the "VENT" damper valve 36 partially opens the "VENT" outlet duct 14 and the "HEAT" damper valve 38 also partially opens the "HEAT" outlet duct 16 and "HEAT/R" outlet duct 20, so that air flows out from the "VENT" outlet duct 14, "HEAT" outlet duct 16 and "HEAT/R" outlet duct 20.

When the air change-over lever 88 is set in "FRESH" position F, the air change-over damper valve 34 opens the external air intake duct 6 and closes the internal air intake duct 10, so that only external air is introduced from outside.

When the air change-over lever 88 is set in "REC" position H, the air change-over damper valve 34 closes the external air intake duct 6 and opens the internal air intake duct 10, so that only internal air is introduced and recirculated.

When the air change-over lever 88 is set in an intermediate position G between "FRESH" position F and "REC" position H, the air change-over damper valve 34 partially opens both the external air intake duct 6 and the internal air intake duct 10, so that external air is introduced and part of internal air in the cabin 8 is recirculated.

The rotation of the fan motor 42 driving the fan 28 is controlled by known means through the fan switch 96 provided on the operating panel 54. The flow rate of hot water to the heater core 30 is controlled by the regulating valve 44 that is actuated through known means by the warm air control lever 92 provided on the operating panel 54. The temperature of cool air is controlled by the cooler core 32 that is actuated through a thermo-switch, cooler compressor magnetic clutch or other known control means by the cool air control lever 94 on the operating panel 54.

Next, a lamp lighting circuit 198 provided on the base plate 62 of the operating panel 54 of the first embodiment will be described by reference to FIGS. 10 through 14.

Reference numeral 200 designates an outlet duct selection switch connected to the outlet duct selection lever 90, 202 an air change-over switch connected to the air change-over lever 88, 204 a warm air detecting switch connected to the warm air control lever 92. A cool air detecting switch 206 is connected to the cold air control lever 94, and a fan detecting switch 208 is interlocked with the fan switch 96. These detecting switches for detecting the operation of said control means are provided either inside the operating panel 54 or outside thereof through wires, links, rods or other connecting means.

The outlet duct selection switch 200 has a first to third contact 210, 212 and 214, which are fixed to the outlet duct selection lever 90 and slide integrally therewith, and an electrode plate 216 is fixed to the operating panel 54. The electrode plate 216 is provided with an electrode 218 that is so constructed that the outlet duct selection lever 90, sliding from "DEF" position A to "HEAT" position E, comes in contact with only the first contact 210 when the lever 90 is in "DEF" position A, with the first and second contacts 210 and 212 when the lever 90 is in the intermediate position B between "DEF" and "VENT" positions, with only the second contact 212 when the lever 90 is in "VENT" position C, with the second and third contacts 212 and 214 when said lever 90 is in the intermediate position D between "VENT" and "HEAT" position, and with only the third contact 214 when said lever 90 is in "HEAT" position E.

The first contact 210 connects with positive-side terminals 220 and 222 of the red and blue lamps 126 and 128, respectively, the second contact 212 with a positive-side terminal 224 of the blue lamp 132, and the third contact 214 with positive-side terminals 226, 228, 230 and 232 of the red lamps 136 and 137 and blue lamps 138 and 139, respectively. Diodes D1 through D7 to prevent the counter-flow of electric current are interposed between said contacts 210, 212 and 214 and said positive-side terminals.

The air change-over switch 202 has a first contact 234 and a second contact 236 that operate interlockingly. The first contact 234 connects through diodes D8, D9, D10 and D11 with positive-side terminals 238, 240, 242 and 244 of the red lamp 114, blue lamp 116, red lamp 142 and blue lamp 144, respectively. The second contact 236 contacts through diodes D12 and D13 with positive-side terminals 248 and 250 of the red and blue lamps 120 and 122, respectively. A first electrode 252 adapted to contact the first contact 234 connects with a positive terminal 264 of a power supply 262 through a first terminal 253 and then a switch contact 258 of a relay switch 256 operated by a car-speed detecting device 254, a diode D14 and a switch contact 260 of the fan detecting switch 208 which are connected in parallel. A second electrode 266 adapted to contact the second contact 236 connects with the positive terminal 264 of the power supply 262 through a second terminal 267 and the switch contact 260 of the fan detecting switch 208. Reference 268 designates an illumination switch that opens and closes interlockingly with a lighting switch, not shown, for headlights and other night illuminating devices and connects with a lamp 158 provided in the vicinity of an edge of the transparent plate 56 of the operating panel 54. The first electrode 252 contacting the first contact 234 connects also with the electrode 218 of the electrode plate 216 through the first terminal 253.

A collective negative-side terminal 270 for the red lamps and a collective negative-side terminal 274 for the blue lamps connect with a dimmer 278 to form a light intensity control circuit 280, through a "HOT" side terminal 272 of the warm air detecting switch 204 and a "COOL" side terminal 276 of the cool air detecting switch 206, respectively. The collective negative-side terminal 274 connects with an "OFF" side terminal 282 of the warm air detecting switch 204. Reference numeral 284 denotes a switch contact provided to a central contact 286 of the warm air detecting switch 204, 288 a switch contact provided to a central contact 290 of the cool air detecting switch 206, and 292 an "OFF" side terminal of the cool air detecting switch 206.

Figure 11:
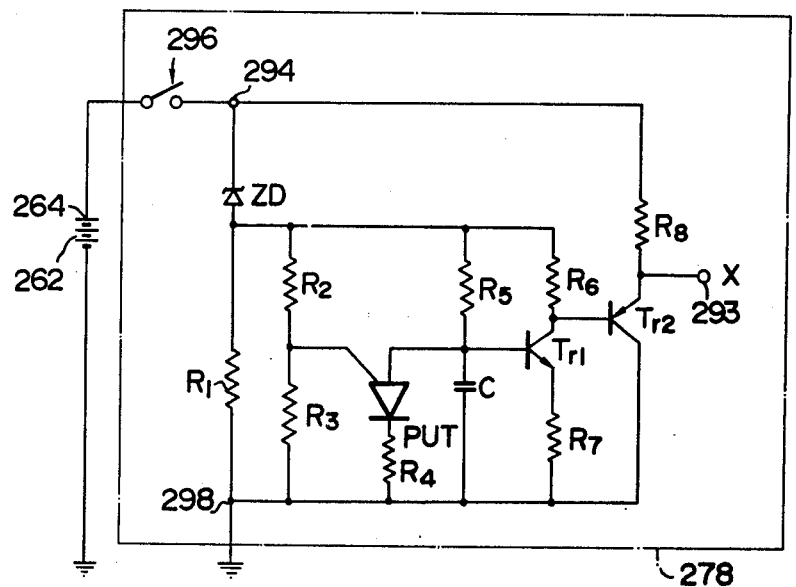
FIG. 11 is a circuit diagram of a light-intensity controller shown in FIG. 10.
Figure 12:
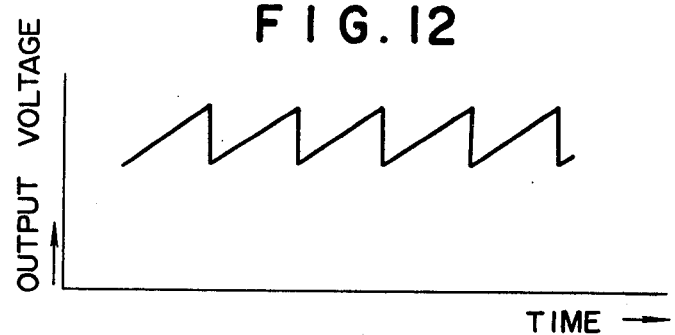
FIG. 12 is a graphic representation of the output voltage characteristic of the light-intensity controller of FIG. 11.
Figure 13:
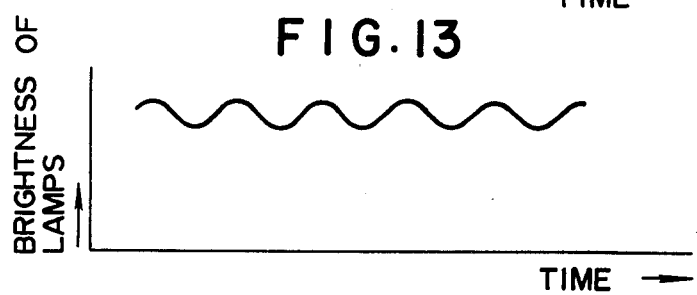
FIG. 13 is a graphic representation of the lamp luminance characteristic produced by the light-intensity controller of FIG. 11.

Now the dimmer 278 will be described by reference to FIGS. 11 through 13. The dimmer 278 to cause the lamps to flicker by changing their luminance comprises a programmable unijunction transistor PUT, resistors R1 through R8, transistors Tr1 and Tr2, a capacitor C, and a Zener diode ZD. By inverting an output voltage, shown in FIG. 12, generated by an oscillation circuit, which comprises the programmable unijunction transistor PUT, resistors R2 through R5 and capacitor C, through the transistors Tr1 and Tr2 and resistors R6, R7 and R8 and changing the potential at an X terminal 293, luminance of the lamps connected to the X terminal 293 changes as shown in FIG. 13. The resistor R1 and Zener diode ZD perform a function of applying a D.C. bias to the output voltage from the oscillation circuit so that the lamps become only brighter and darker without going off. The X terminal 293 connects with the central contact 286 of the warm air detecting switch 204 and the central contact 290 of the cool air detecting switch 206. A power supply terminal 294 connects with the positive terminal 264 of the power supply 262 through a power supply switch 296 interlocked with the engine ignition switch. A ground terminal 298 is suitably grounded.

Figure 14:
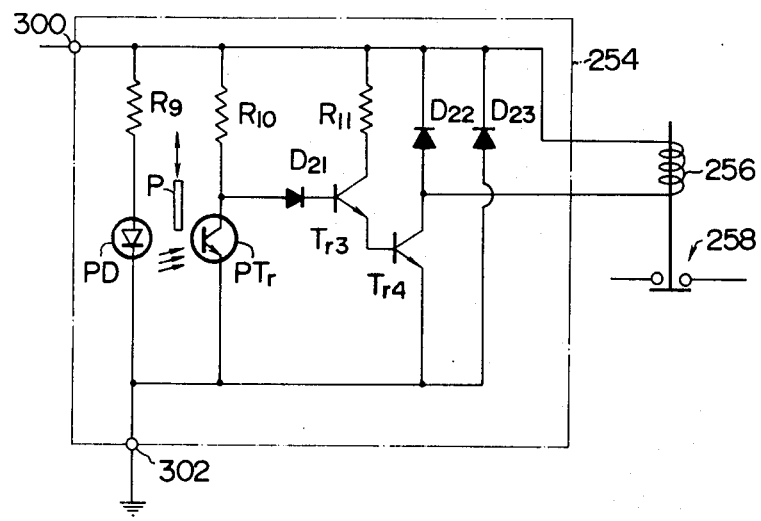
FIG. 14 is a circuit diagram of a car-speed detector shown in FIG. 10.

The car-speed detecting device 254 will be described by reference to FIG. 14. The car-speed detecting device 254 comprises a light-emitting diode PD, a phototransistor PTr, diodes D21 through D23, transistors Tr3 and Tr4, resistors R9 through R11, and a rotating plate P. When the car is at a standstill or running at a very low speed, such as under 10 km per hour, the rotating plate P interlocked with the speed meter indicator does not come in between the light-emitting diode PD and phototransistor PTr. Consequently, the light, e.g., infrared rays, emitted from the light-emitting diode PD reaches the phototransistor PTr, the internal resistance of the phototransistor PTr becomes extremely low as compared with the resistance introduced by the resistor R10, the voltage applied to the diode D21 becomes extremely low, the transistors Tr3 and Tr4 remain inoperative, and, therefore, the relay switch 256 is not excited and the switch contact 258 remains opened. When the car speed exceeds 10 km per hour, the rotating plate P interlocked with the speed meter indicator intervenes between the light-emitting diode PD and phototransistor PTr. Thereupon, the infrared rays from the light-emitting diode PD do not reach the phototransistor PTr, the resistance of the phototransistor PTr becomes substantially equal to that of the resistor R10, a predetermined voltage is applied on the diode D21, the transistors Tr3 and Tr4 conduct, and the relay switch 256 becomes excited to close the switch contact 258. A power supply terminal 300 connects with the positive terminal 264 of the power supply 262, and a ground terminal 302 is suitably grounded.

The operation of the first embodiment of this invention constructed as described above will be explained hereunder.

First, the air change-over lever 88 is set in "FRESH" position F, the warm air control lever 92 in "OFF" position, and the cool air control lever 94 in "OFF" position. When the car is running at a speed of not higher than 10 km per hour and the fan switch 96 is in "OFF" position in this condition, the air conditioner proper 2 introduces little fresh air from the external air intake duct 6 and the outlet ducts 14, 16, 20 and 24 discharge no air. At this time, the switch contact 258 actuated by the car-speed detecting device 254 and the switch contact 260 of the fan detecting switch 208 interlocked with the fan switch 96 are open. Therefore, no electric current is supplied to the lamps, and the lamps do not light.

When the car speed exceeds 10 km per hour and the fan detecting switch 208 is turned on, fresh air is introduced from the external air intake duct 6, under the influence of the wind pressure generated by the car running at such high speed or the sucking force of the fan driven by the fan motor 42. At this time, the switch contact 258 actuated by the car-speed detecting device 254 and the switch contact 260 of the fan detecting switch 208 close, and electric current is supplied to the lamps through the first switch 234 of the air change-over switch 202. But as the warm air detecting switch 204 connects with the "OFF" side terminal 282 and the cold air detecting switch 206 with the "OFF" side terminal 292, only the collective terminal 274 for the blue lamps in the light intensity control circuit 280 is grounded through the dimmer 278. Accordingly, the blue lamp 116 corresponding to the "FRESH" indicating arrow 101 and the blue lamp corresponding to the "REAR VENT" indicating arrow light. Also, the blue lamps 128, 132, 138 and 139 corresponding to the arrows 105, 107 and 109 and connected to the first, second and third contacts 210, 212 and 214 that come in contact with the electrode 218 of the electrode plate 216 depending on the position of the outlet duct selection lever 90, light.

The light emitted by the lit blue lamps passes through the plurality of arrow-shaped openings in the shielding plate 60 and projects indicating arrows through the smoked panel 58 on the transparent plate 56 as indicated by a broken line on FIG. 3. As the lamps are grounded through the dimmer 278, the projected light becomes brighter and darker repeatedly, so that the arrow-shaped indications look like actual flows of air.

Namely, when external air flows out from an outlet duct of the air conditioner proper 2 depending on the position of the outlet duct selection lever 90, indication arrows corresponding to the outlet duct flicker on the operating panel 54 and become perceptible to the passenger. Even if the cool air control lever 94 is operated to actuate the cooler core 32 to supply cool air, the lamps remain lighted.

On sliding the warm air control lever 92 over a given distance toward "HOT" and opening the regulating valve 44 of the heater core 30, hot water is introduced into said heater core 30 and warm air is supplied from the air conditioner proper 2 through the outlet ducts. Because the warm air detecting switch 204 is on the "HOT" side, the collective negative-side terminal 274 for the blue lamps is opened, while the collective negative-side terminal 270 for the red lamps alone is connected through the "HOT" side terminal 272 to the dimmer 278 and grounded therethrough. Therefore, only the red lamps go on. In the vicinity of the "VENT" indicating arrows 107, however, there is provided only the blue lamp 132, as provision is made not to supply warm air from the "VENT" outlet duct 14 of the air conditioner proper 2. Accordingly, only the blue lamp 132 lights, depending on the operation of the outlet duct selection lever 90, to project blue arrows through the arrow-shaped openings 106 on the transparent plate 56. When the cool air control lever 94 is operated to supply a mixture of warm and cool air from the outlet ducts, the blue lamps go on along with the red lamps in accordance with the selection made by the outlet duct selection switch 200 on the outlet duct selection lever 90, because the cool air detecting switch 288 on the lever 94 connects with the "COOL" side terminal 276. Consequently, the red and blue lights mix to emit a pale purple light. On moving the air change-over lever 88 to "REC" position H, the air conditioner proper 2 opens the internal air intake duct 10 and closes the external air intake duct 6. As a result, the car-speed-dependent introduction of external air terminates, and the air inside the cabin 8 is forcibly circulated by the fan 28 driven by the fan motor 42.

At this time, the second contact 236 of the air change-over switch 202 on the air change-over lever 88 connects with the "REC" side terminal 266, and therefore the "FRESH" indicating arrows 101 are not lighted. When the fan 28 is driven by the fan motor 42, the switch contact 260 of the fan detecting switch 208 closes, the "REC" indicating arrows 103 are lighted red or blue, depending on the conducting condition of the negative-side terminal of the light intensity control circuit 280. More specifically, when the warm air detecting switch 204 connects with the "OFF" side terminal 282 or the cool air detecting switch 206 with the "COOL" side terminal 276, no warm air but cool air is supplied from the outlet ducts, and the "REC" indicating arrows 103 are lighted blue by the blue lamp 122. When the warm air detecting switch 204 connects with the "HOT" side terminal 272 and the cool air detecting switch 206 with the "OFF" side terminal 292, the "REC" indicating arrows 103 are lighted red by the red lamp 120. When the warm air detecting switch 204 connects with the "HOT" side terminal 272 and the cool air detecting switch 206 with the "COOL" side terminal 276, both the red and blue lamps 120 and 122 light to project the "REC" indicating arrows 103 in pale purple.

The above-described variety of indications and colors, related to the operation of the control levers, fan switch 96 and car-speed detecting device 254, are summarized in Table 1 (indications dependent on the positions of the air change-over lever 88) and Table 2 (indications dependent on the positions of the outlet duct selection lever 90).

According to this embodiment, as understood from the above, the indicating arrows are lighted on the operating panel 54 in accordance with the operating condition of the air change-over and outlet duct selection levers of the air conditioner proper 2 mounted on the automobile 4. In addition, the indications are projected in blue when cool air is discharged and in red when warm air is supplied, by the operation of the warm and cool air detecting switches 204 and 206, respectively. Therefore, the driver and other passenger can readily perceive the operating condition of the air conditioner proper 2.

Because of the dimmer 278 provided in the light intensity control circuit 280, the indicating arrows projected on the operating panel 54 flicker, giving an impression of actual air flow that is pleasant to the eye and assures unerring perception.

Furthermore, even one who is unacquainted with the operation of the air conditioner porper 2 can operate it with great ease by setting the control levers etc. to positions corresponding to the indicating letters on the operating panel 54.

By the action of the car-speed detecting device 254 and fan detecting switch 204, the indicating arrows are projected only when air is actually flowing out from the outlet ducts, thus facilitating the confirmation of the operating condition of the air conditioner proper 2.

The red and blue lamps used in the above-described embodiment may be replaced with lamps of other warm color (such as orange) representing warm air and lamps of other cool color (such as green) representing cool air, respectively. They may also be replaced with white-color or daylight color lamps, or with spontaneous light-emitting elements, liquid crystal, and other suitable lighting means.

In the above-described embodiment, the relay switch 256 of the car-speed detecting device 254 is adapted to operate when the car speed exceeds 10 km per hour. But the switch contact 258 may be so designed as to open only while the car is at a standstill and close as soon as the car starts to run. Or the open-close critical point need not be limited to 10 km per hour, but may be set at other suitable speed.

The air conditioner proper 2 of the above-described embodiment has the heater core 30 controlled by the warm air control lever 92 and the cooler core 32 controlled by the cool air control lever 94. But one that has only the heater core 30 and controls temperature with the warm air control lever 92 alone can exhibit similar operation and result.

The warm air detecting switch 204 is provided on the warm air control lever 92 and the cool air detecting switch 206 on the cool air control lever 94. They may also be so designed as to directly detect the temperature of air flowing out of the outlet ducts and be operated dependent thereon.

Figure 15:
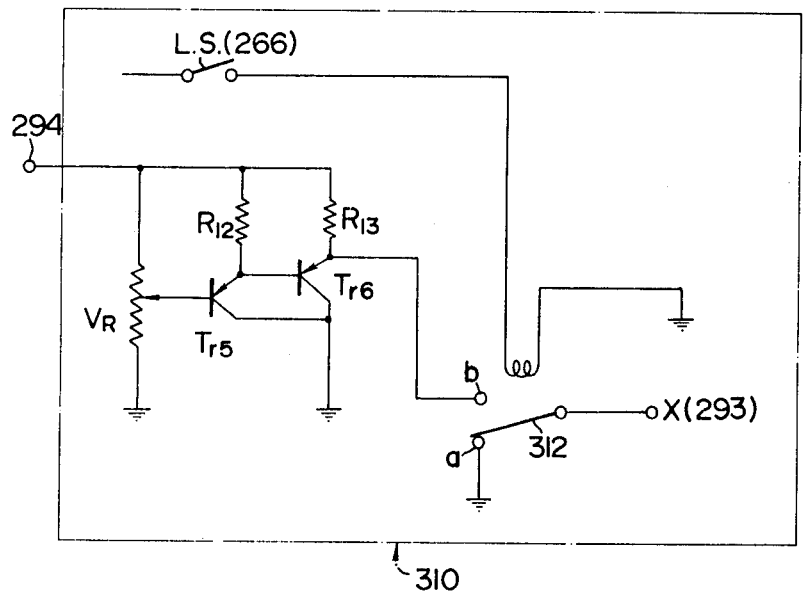
FIG. 15 is a diagram showing a light-dimming circuit provided in the light-intensity controlling circuit of FIG. 10.

The dimmer 278 in the light intensity control circuit 280 may be replaced with a light-dimming circuit 310 as shown in FIG. 15.

The light-dimming circuit 310 is fed with electric current from the power supply terminal 294 and comprises a variable resistor VR, resistors R12 and R13, transistors Tr5 and Tr6, a relay R, and a lighting switch LS (or the function of the lighting switch LS may be served by the illumination switch 268 of the lamp 158). On turning off the lighting switch LS, a movable piece 312 connects with an a contact and the X terminal 293, connecting with the lamps, becomes grounded. Consequently, the lamps light bright enough to permit easy perception in such light environments as in daylight. On turning on the lighting switch LS, the movable piece 312 connects with a b contact which becomes grounded via the power transistors Tr5 and Tr6. Accordingly, the lamps emit a darker light than when the movable piece 312 is in contact with the a contact, whereby excessively bright illumination of the indicating arrows in such dark environments as in the night can be avoided.

Figure 16:
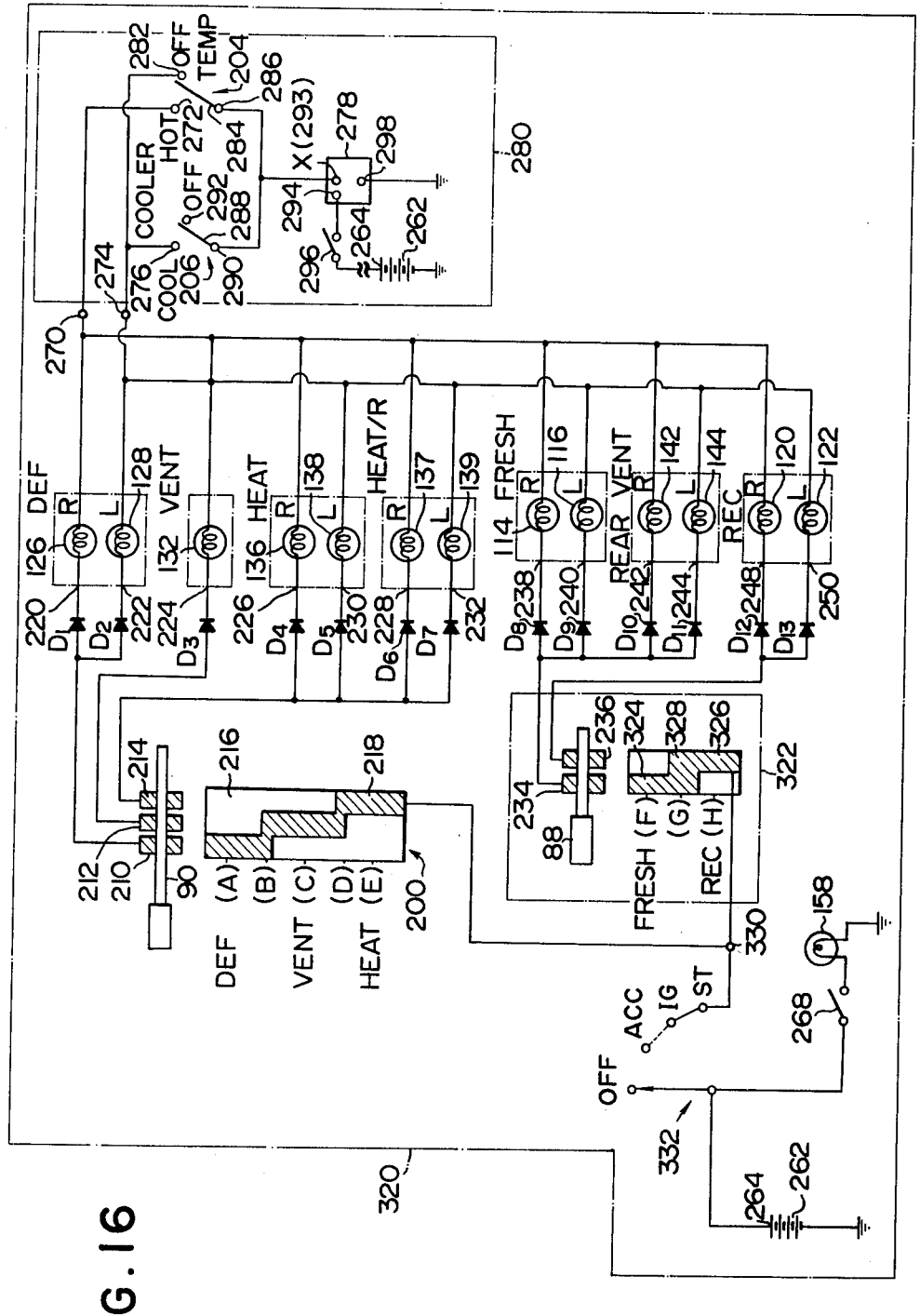
FIG. 16 is a diagram showing a lamp lighting circuit of a second embodiment of this invention.

Next, a second embodiment of this invention will be described by reference to a lamp-lighting circuit 320 shown in FIG. 16. Similar reference numerals, as used in the description of the first embodiment, denote similar parts, and detailed descriptions thereof are omitted. This embodiment differs from the lamp lighting circuit 198 of the first embodiment, shown in FIG. 10, in that the car-speed detecting device 254 and fan detecting switch 208 are eliminated, and an air change-over switch 322, in which the interlocked first and second contacts 234 and 236 are attached to the air change-over lever 88, is provided. The air change-over switch 322 has an electrode 328 comprising a first electrode piece 324 on the side of said first contact 234 and a second electrode piece 326 on the side of said second contact 236, which conduct with each other, and connects through a terminal 330 with the electrode 218 of the outlet duct selection switch 200. The terminal 330 connects through a start detecting switch 332 interlocked with an engine key switch, not shown, with the positive terminal 264 of the power supply 262. Like the engine key switch, the start detecting switch 332 has "OFF," "ACC," "IG," and "ST" positions, and electric current is supplied to the terminal 330 only when the switch 332 is in "IG" and "ST" positions. But the switch 332 may be so designed that current is supplied in "ACC" position too, as required, as indicated by a broken line.

With this embodiment, even when the air conditioner proper 2 is not in operation or the fan 28 is not driven, and when the car is not running, the indicating arrows are lighted as shown in Tables 3 and 4 according to the positions of the outlet duct selection lever 90 and the air change-over lever 88. Accordingly, the driver or other passenger can readily set the air conditioner proper to the desired operating condition while, for example, the car is at a standstill, in addition to the previously described operation and result of the first embodiment.

Figure 10:
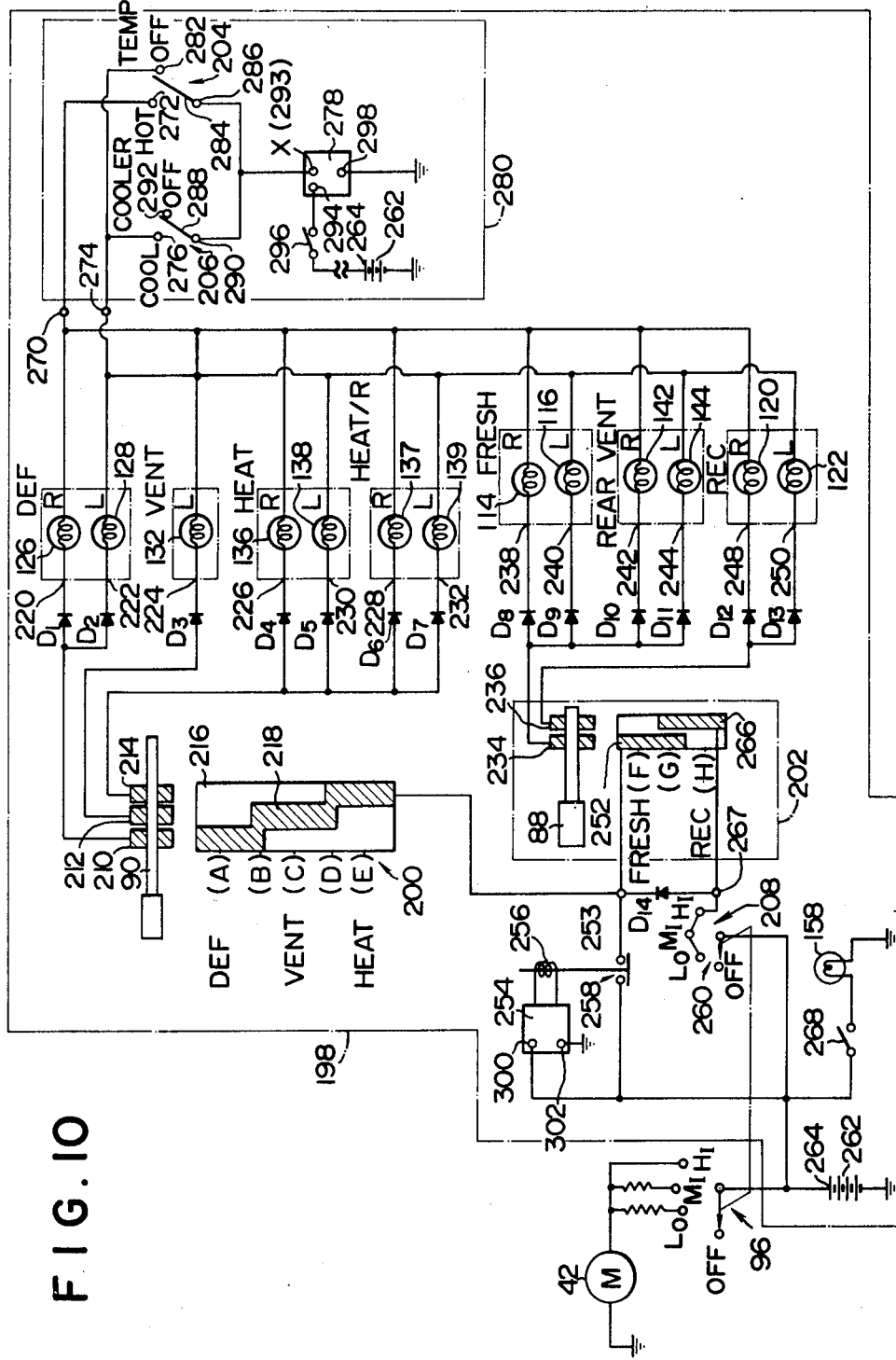
FIG. 10 is a diagram illustrating a lighting circuit of the first embodiment of this invention.
Figure 17:
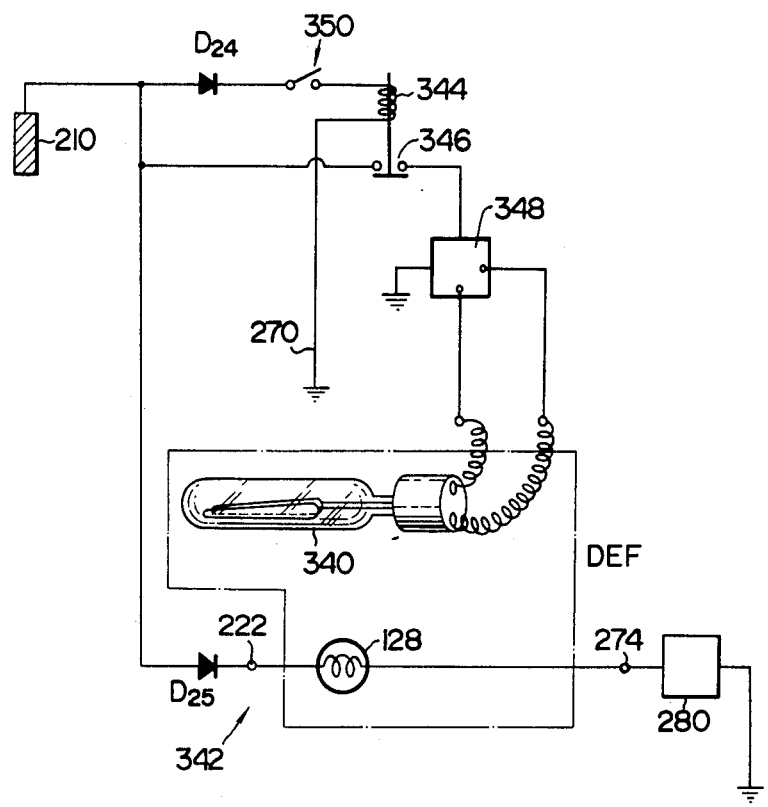
FIG. 17 is a schematic view of a third embodiment of this invention.
Figure 18:
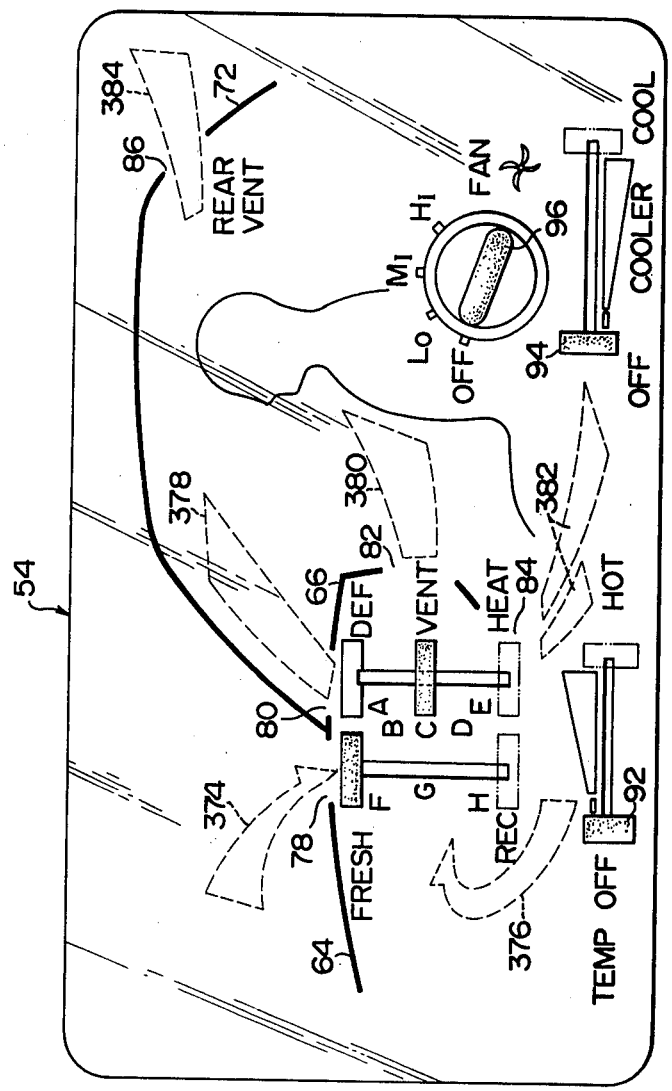
FIG. 18 is a schematic view of an operating panel of a fourth embodiment of this invention.
Figure 19:
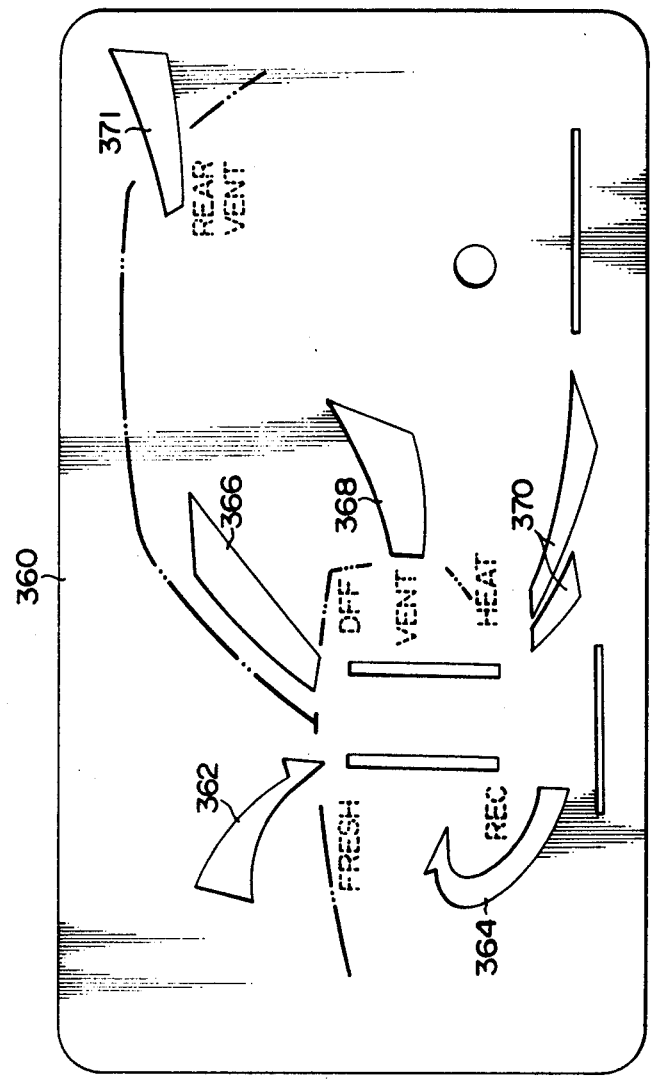
FIG. 19 is a schematic view of a shielding plate of the fourth embodiment of this invention.
Figure 20:
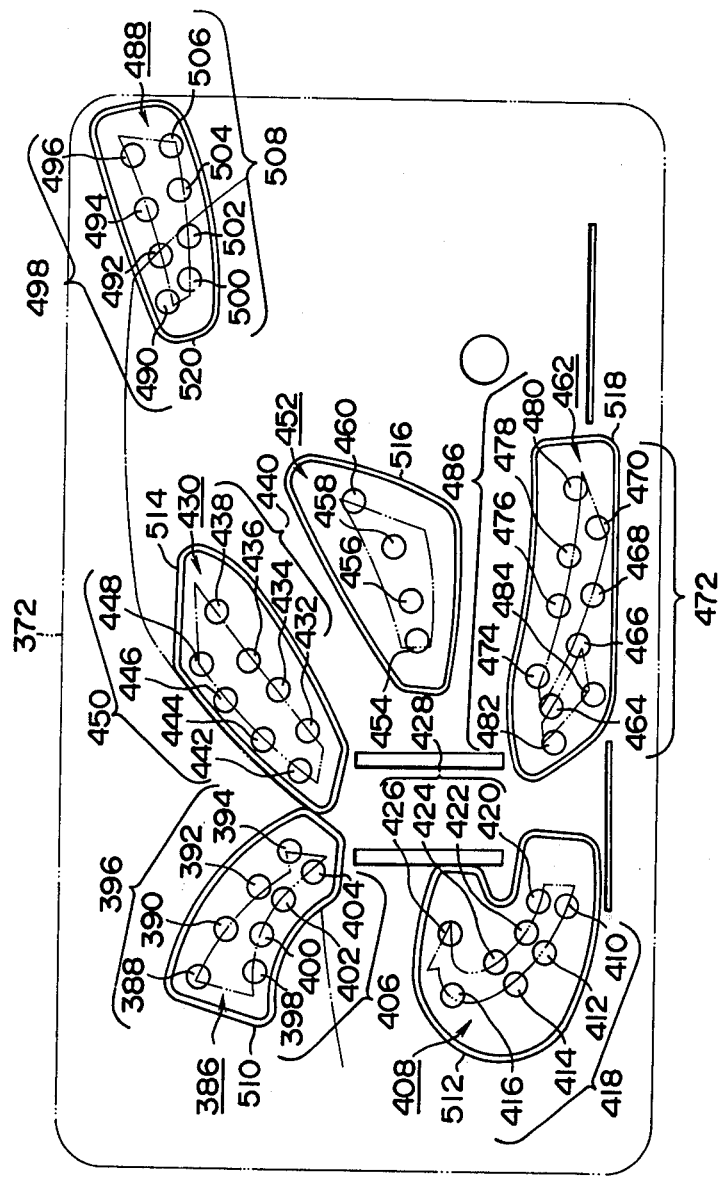
FIG. 20 is a schematic view of a base plate of the fourth embodiment of this invention.

Now a third embodiment of this invention will be described by reference to FIG. 17. Those parts which are similar to ones in the previously described first embodiment are represented by similar reference numerals, and no detailed description is given thereto. This embodiment differs from the first embodiment in that the red lamp 126, lighting the "DEF" indicating arrows, in the lamp lighting circuit 198 in FIG. 10 is replaced with an orange flicker cathode glow lamp 340 receiving electric current from an A.C. power supply to emit a flickering light. A display assembly 342 that lights the "DEF" indicating arrows will be described hereunder.

The display assembly 342 comprises a relay coil 344 connecting through a diode D24 with the first contact 210 of the outlet duct selection switch 200, a switch 346 actuated by said relay coil 344, and an inverter (i.e., a D.C.-A.C. converter) 348 connecting through the switch 346 with the first contact 210 to receive D.C. current. The inverter 348 supplies a.c. current to light the flicker cathode glow lamp 340. Between the relay coil 344 and diode D24 is interposed a switch 350 interlocked with the warm air detecting switch 204 of the light intensity control circuit 280, and the switch 350 closes when said warm air detecting switch 204 connects with the "HOT" side terminal 272. The first contact 210 connects with the light intensity control circuit 280 through a diode D25, the positive-side terminal 222 of the blue lamp 128, and the negative-side terminal 274 of the blue lamp 128.

Arranged as described above, electric current is supplied from the D.C. power supply 262 through the electrode 218 to the first contact 210. Then, when the switch 350 closes, interlockingly with the warm air detecting switch 204, and the relay coil 344 becomes excited to close the switch 346, the inverter 348 functions to light the flicker cathode glow lamp 340 whose lighting point moves arbitrarily. Consequently, the "DEF" indicating arrows 105 are flickeringly lighted in orange as the lighting point moves.

When the cool air detecting switch 206 operates, the blue lamp 128 is lit through the light intensity control circuit 280 to project the "DEF" indicating arrows 105 in blue. Accordingly, when the air conditioner proper 2 discharges warm air from the "DEF" outlet duct 24, the "DEF" indicating arrows 105 on the operating panel 54 are projected in orange by the moving lighting point of the flicker cathode glow lamp 340, just like the actual flow of warm air.

The use of the flicker cathode glow lamp 340 is not limited to the "DEF" indicating arrows 105, but applicable to other indicating arrows, as well. Then, such other indicating arrows also are lighted just like the actual flow of warm air by simply supplying A.C. current, without employing any specific flicker circuit.

Next, a fourth embodiment of this invention will be described by reference to FIGS. 18 through 24. The parts similar to ones in the first embodiment are referred to by similar reference numerals, and no detailed descriptions are given thereto. This embodiment differs from the first embodiment in that each of the lamps in the lamp lighting circuit 198 shown in FIG. 10 is made up of a plurality of lamps, so that the indicating arrows are lighted in the direction of the air flow by successively lighting the plurality of lamps.

A shielding plate 360 constituting the operating panel 54 is provided with an arrow-like, elongated opening 362 in the vicinity of the letters "FRESH," an arrow-like elongated opening 364 in the vicinity of the letters "REC," an arrow-like, elongated opening 366 in the vicinity of the letters "DEF," an arrow-like, elongated opening 368 in the vicinity of the letters "VENT," arrow-like, elongated openings 370 in the vicinity of the letters "HEAT," and an arrow-like, elongated opening 371 in the vicinity of the letters "REAR VENT." When corresponding lamps on a base plate 372 go on, their light passing through these openings projects a "FRESH" indicating arrow 374, "REC" indicating arrow 376, "DEF" indicating arrow 378, "VENT" indicating arrow 380, "HEAT" indicating arrow 382, and "REAR VENT" indicating arrow 384 on the operating panel.

The plurality of lamps are disposed on the base plate 372, along each of said indicating arrows. Reference numeral 368 designates a group of "FRESH" lamps to project the "FRESH" indicating arrow 374 which comprises a "FRESH" red lamp group 396, comprising first to fourth "FRESH" red lamps 388, 390, 392 and 394, and a "FRESH" blue lamp group 406, comprising first to fourth "FRESH" blue lamps 398, 400, 402 and 404. Reference numeral 408 designates a group of "REC" lamps to project the "REC" indicating arrow 376 which comprises a "REC" red lamp group 418, comprising first to fourth "REC" red lamps 410, 412, 414 and 416, and a "REC" blue lamp group 428, comprising first to fourth "REC" blue lamps 420, 422, 424 and 426. Reference numeral 430 designates a group of "DEF" lamps to project the "DEF" indicating arrow 378 which comprises a "DEF" red lamp group 440, comprising first to fourth "DEF" red lamps 432, 434, 436 and 438, and a "DEF" blue lamp group 450, comprising first to fourth "DEF" blue lamps 442, 444, 446 and 448. Reference numeral 452 designates a group of "VENT" blue lamps to project the "VENT" indicating arrow 380, which comprises first to fourth "VENT" blue lamps 454, 456, 458 and 460. Reference numeral 462 designates a group of "HEAT" lamps to project the "HEAT" indicating arrow 382 which comprises a "HEAT" red lamp group 472, comprising first to fourth "HEAT" red lamps 464, 466, 468 and 470, and a "HEAT" blue lamp group 486, comprising first to sixth "HEAT" blue lamps 474, 476, 478, 480, 482 and 484. And reference numeral 488 designates a group of "REAR VENT" lamps to project the "REAR VENT" indicating arrow 384 which comprises a "REAR VENT" red lamp group 498, comprising first to fourth "REAR VENT" red lamps 490, 492, 494 and 496, and a "REAR VENT" blue lamp group 508, comprising first to fourth blue lamps 500, 502, 504 and 506.

Each of the lamp groups is enclosed by a partition so that the light emitted from each lamp group passes only through the corresponding arrow-like opening to project the corresponding indicating arrow. Reference numeral 510 denotes a partition enclosing the "FRESH" lamp group 386, 512 a partition enclosing the "REC" lamp group 408, 514 a partition enclosing the "DEF" lamp group 430, 516 a partition enclosing the "VENT" lamp group 452, 518 a partition enclosing the "HEAT" lamp group 462, and 520 a partition enclosing the "REAR VENT" lamp group 488.

Figure 21:
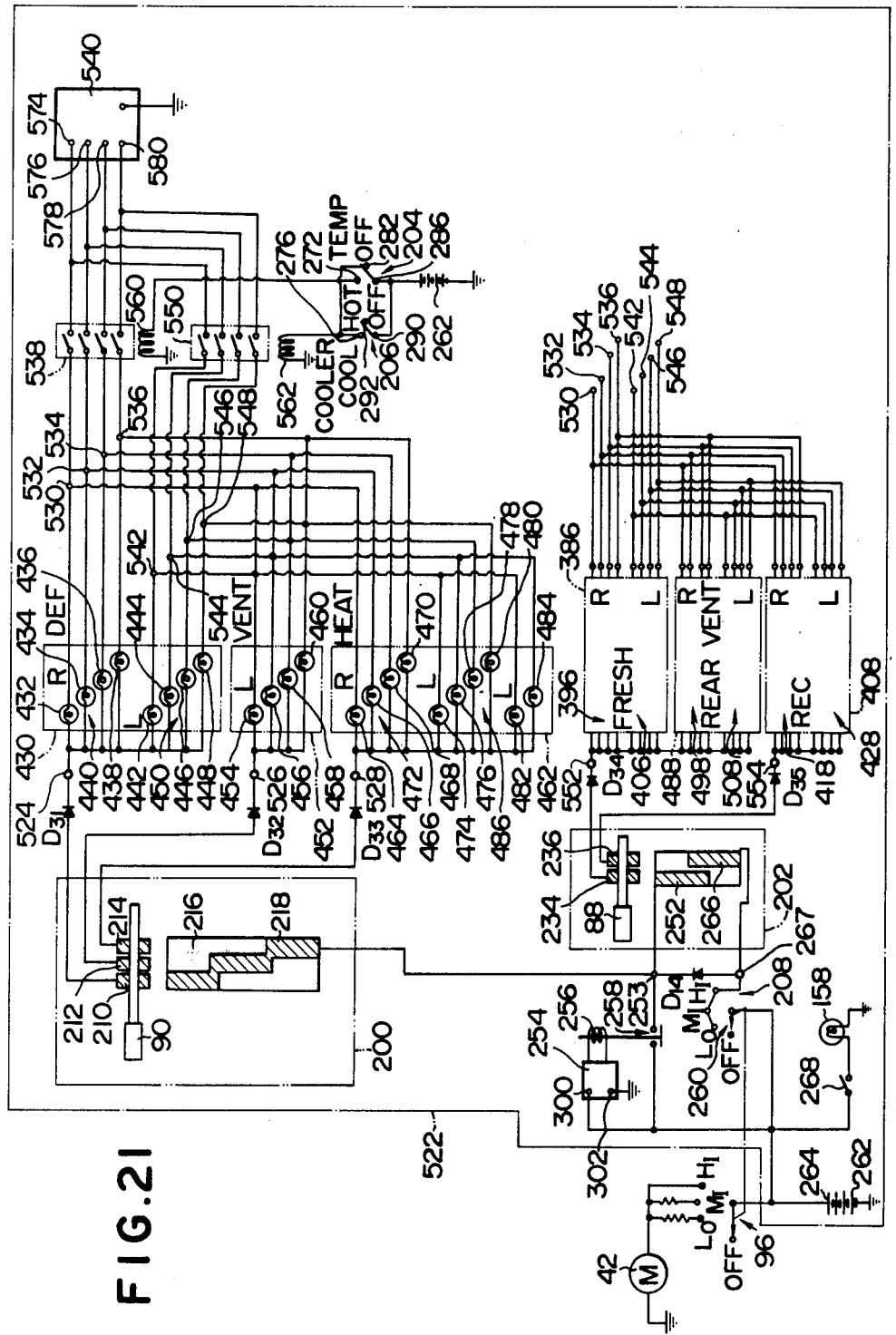
FIG. 21 is a diagram showing a lamp lighting circuit of the fourth embodiment of this invention.

Now a lamp lighting circuit 522 will be described by reference to FIG. 21.

All positive-side terminals of the "DEF" lamp group 430, projecting the corresponding indicating arrow, collectively connect through a "DEF" collective positive-side terminal 524 and a diode D31 with the first contact 210 of the outlet duct selection switch 200, all positive-side terminals of the "VENT" lamp group 452 through a "VENT" collective positive-side terminal 526 and a diode D32 with the second contact 212 of the outlet duct selection switch 200, and all positive-side terminals of the "HEAT" lamp group 462 through a "HEAT" collective positive-side terminal 528 and a diode D33 with the third contact 214 of said outlet duct selection switch 200.

The negative-side terminals of the first, second, third and fourth lamps of the "DEF" red lamp group 440, "VENT" blue lamp group 452 and "HEAT" red lamp group 472 collectively connect through a first red lamp collective negative-side terminal 530, second red lamp collective negative-side terminal 532, third red lamp collective negative-side terminal 534 and fourth red lamp collective negative-side terminal 536, and then through a warm air four-way switch 538, with a flicker device 540.

The negative-side terminals of the first, second, third and fourth lamps of the "DEF" blue lamp group 450, "VENT" blue lamp group 452 and "HEAT" blue lamp group 486 collectively connect through a first blue lamp collective negative-side terminal 542, second blue lamp collective negative-side terminal 544, third blue lamp collective negative-side terminal 546 and fourth blue lamp collective negative-side terminal 548, and then through a cool air four-way switch 550, with the flicker device 540. The fifth and sixth lamps 482 and 484 of the "HEAT" blue lamp group 486 connect with said first and second blue lamp collective negative-side terminals 542 and 544, respectively.

All positive-side terminals of the "FRESH" lamp group 386 and "REAR VENT" lamp group 488 collectively connect through a "FRESH" collective positive-side terminal 552 and a diode D34 with the first contact 234 of the air change-over switch 202. All positive-side terminals of the "REC" lamp group 408 collectively connect through a "REC" collective positive-side terminal 554 and a diode D35 with the second contact 236 of said air change-over switch 202.

The negative-side terminals of the first, second, third and fourth lamps of the "FRESH" red lamp group 396, "REAR VENT" red lamp group 498, and "REC" red lamp group 418 collectively connect with said first red lamp collective negative-side terminal 530, second red lamp collective negative-side terminal 532, third red lamp collective negative-side terminal 534 and fourth red lamp collective negative-side terminal 536.

The negative-side terminals of the first, second, third and fourth lamps of the "FRESH" blue lamp group 406, "REAR VENT" blue lamp group 508, and "REC" blue lamp group 428 collectively connect with said first blue lamp collective negative-side terminal 542, second blue lamp collective negative-side terminal 544, third blue lamp collective negative-side terminal 546 and fourth blue lamp collective negative side terminal 548.

The warm air four-way switch 538 is actuated by a relay coil 560 connecting with the "HOT" side terminal 272 of the warm air detecting switch 204. The cool air four-way switch 550 is actuated by a relay coil 562 connecting with the "COOL" side terminal 276 of the cool air detecting switch 206 and the "OFF" side terminal 282 of the warm air detecting switch 204. The relay coils 560 and 562 are supplied with electric current from the power supply 262 connected through the central terminals 286 and 290 of said detecting switches 204 and 206.

The flicker device 540 will be described by reference to FIGS. 22 through 24. This flicker device 540 turns on the first through fourth lamps of each lamp group one after another so that the corresponding indicating arrow is projected like the actual flow of air.

In FIG. 22, the flicker device 540 comprises a known oscillation circuit 570 composed of NAND gates, capacitors, diodes and resistors, a known binary counter 572, four AND gates A1, A2, A3 and A4, four resistors R14, R15, R16 and R17, and four transistors Tr7, Tr8, Tr9 and Tr10.

On turning a key switch, not shown, to IG position, the oscillation circuit 570 alternately generates a Q-output-signal Q1 and a $\overline{Q}$-output-signal $\overline{Q1}$. The Q-output-signal Q1 generated by the oscillation circuit 570, as shown in FIG. 23 (a), is supplied to the binary counter 572 and also to the AND gates A1 and A3. The $\overline{Q}$-output-signal $\overline{Q1}$, shown in FIG. 23 (b), is supplied to the AND gates A2 and A4. Intermittently supplied with the Q-output-signal Q1, the binary counter 572 simultaneously generates a Q-output-signal Q2 and a $\overline{Q}$-output-signal $\overline{Q2}$, as shown in FIG. 23 (c) and (d), which are supplied to the AND gates A1 and A2 and the AND gates A3 and A4, respectively.

Figure 23:
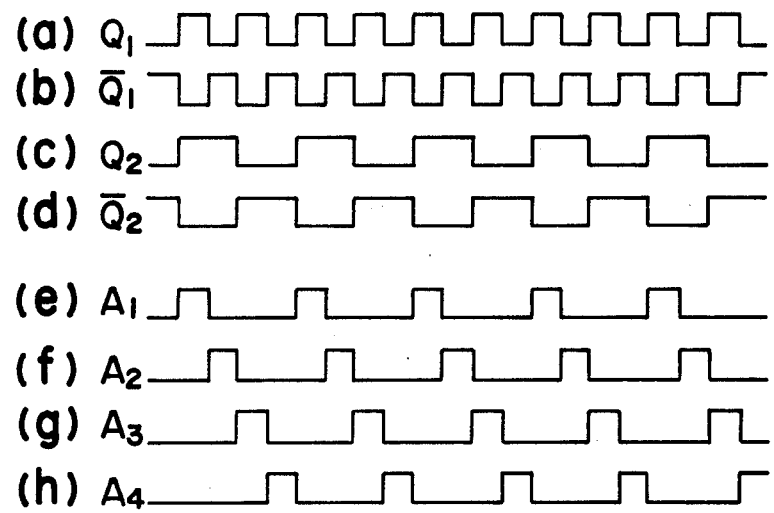
FIG. 23 shows the oscillation characteristics of the flicker device of FIG. 22.

When supplied with the Q-output-signal Q1 and Q2 and the $\overline{Q}$-output-signals $\overline{Q1}$ and $\overline{Q2}$ shown in FIG. 23 (a) through (d), the AND gates A1 through A4 generate outputs, as shown in FIG. 23 (e) through (h), to successively put in conduction the transistors Tr7, Tr8, Tr9 and Tr10, and then terminals 574, 576, 578 and 580 connected with the transistors.

The terminals 574 to 580 are connected to a first lamp L1, second lamp L2, third lamp L3 and fourth lamp L4 representing the first to fourth lamps of each lamp group.

Figure 24:
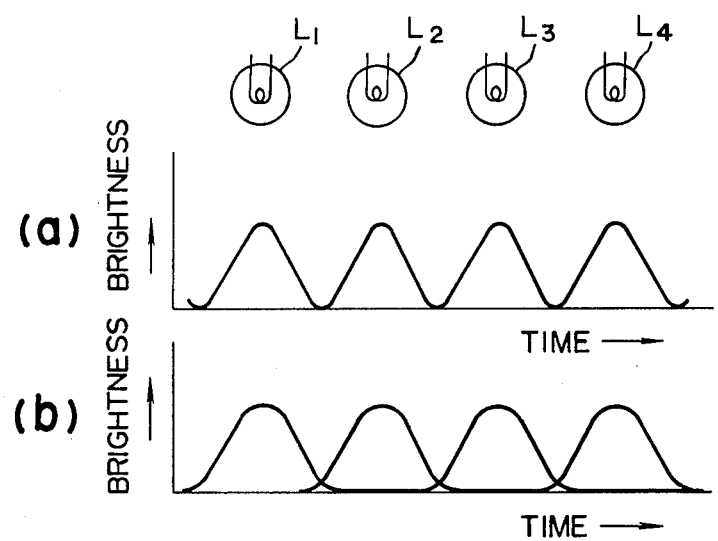
FIG. 24 is a graphical representation of the lamp lighting characteristics produced by the flicker device of FIG. 22.

By the operation of said transistors, only the first lamp L1 lights first, and the first lamp L1 goes off and only the second lamp L2 goes on, followed by the lighting of only the third lamp L3, and the fourth lamp L4, in the same manner, as shown in FIG. 24 (a). Returning to the first lamp L1, the same cycle is repeated.

By modifying the make-up of the flicker device 540, the lamps L1 through L4 can go on and off overlappedly, as shown in FIG. 24 (b).

Operation of this embodiment is identical with that of the first embodiment described previously. Whether or not, and in what color, the lamps are lighted by the operation of the outlet duct selection lever, air change-over lever and so on will not be discussed here, since their lighting conditions are exactly the same as those given in Tables 1 and 2.

The elongated single arrow projected on the operating panel 54 of this embodiment gives a brighter and easier-to-perceive indication than the plurality of arrows of the first embodiment.

Figure 25:
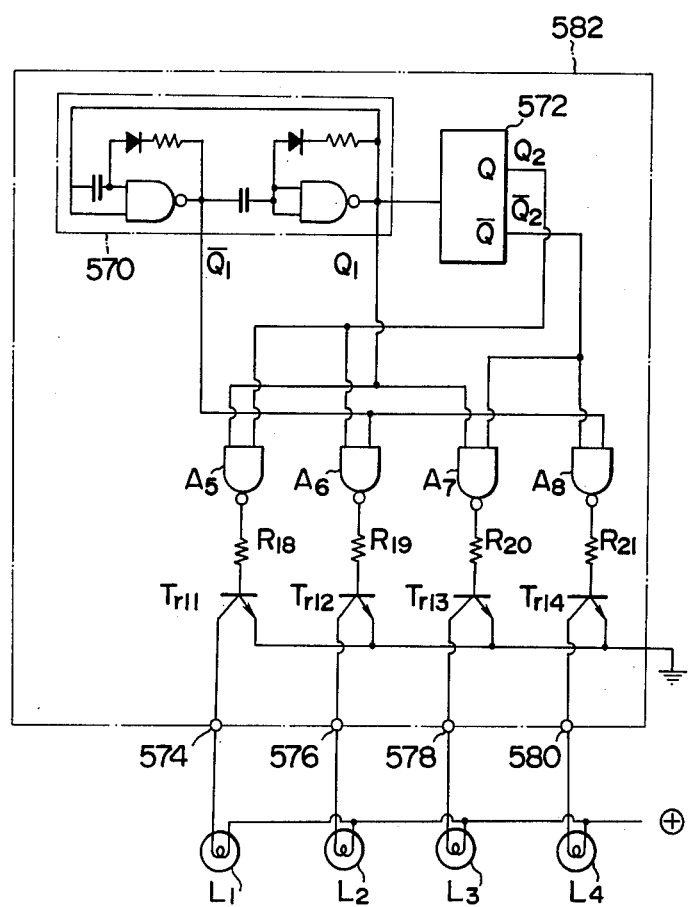
FIG. 25 is a circuit diagram of a modification of the flicker device of the fourth embodiment of this invention.

Next, a modification of the flicker device 540, shown in FIG. 22, of the fourth embodiment will be described by reference to FIG. 25. Item 582 is a flicker device, in which the first to fourth lamps L1 through L4 of each lamp group are all lighted first and go off one after another, so that motion of dark point in each projected arrow indicates the flow of air.

This flicker device 582 comprises a known oscillation circuit 570 composed of NAND gates, capacitors, diodes and resistors, a known binary counter 572, four NAND gates A5, A6, A7 and A8, four resistors R18, R19, R20 and R21, and four transistors Tr11, Tr12, Tr13 and Tr14.

As in the flicker device 540 of FIG. 22, the oscillation circuit 570 and the binary counter 572 of the flicker device 582 supply output signals Q1 and $\overline{Q1}$ and Q2 and Q2, respectively, to the NAND gates A5 through A8, whereupon the terminals 574 through 580 in conduction become cut-off. Therefore, the first to fourth lamps L1 through L4, all lighted first, go off one after another in that order, so that the moving dark point in the projected arrow gives a flowing impression to the eye.

Figure 26:
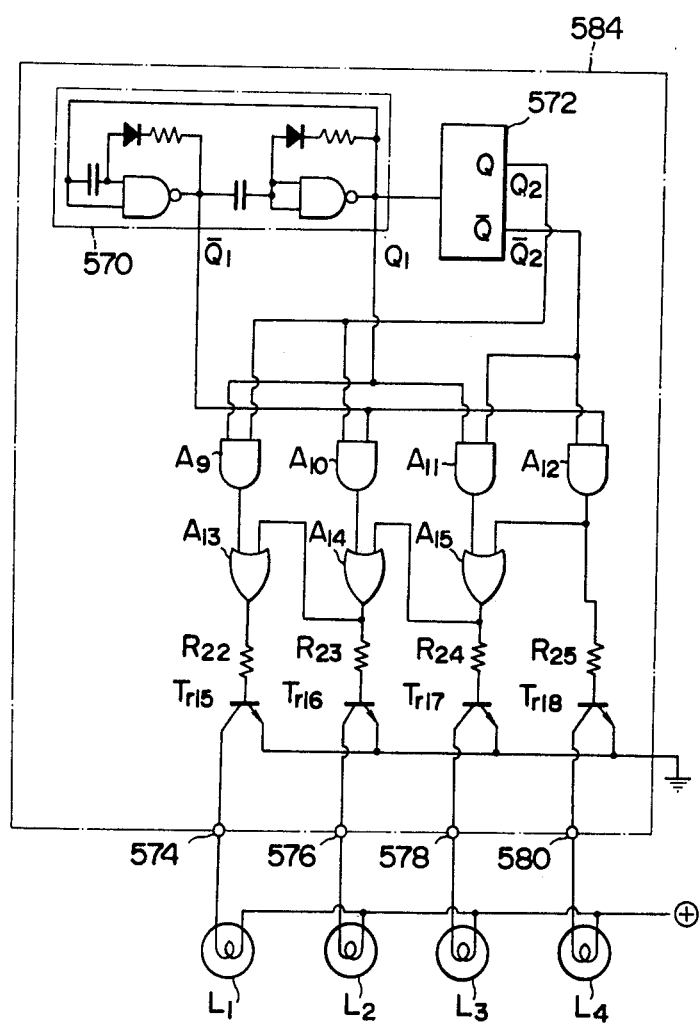
FIG. 26 is a circuit diagram of another modification of the flicker device of the fourth embodiment of this invention.

Now another modification of the flicker device 540, shown in FIG. 22, of the fourth embodiment will be described by reference to FIG. 26. In a flicker device 584, the first to fourth lamps L1 through L4 of each lamp group are successively lighted in such a way that the first lamp L1 is first lighted, and then the second lamp L2 while the first lamp L1 is still on, similarly followed by the third and fourth lamps L3 and L4.

The flicker device 584 comprises a known oscillation circuit 570 composed of NAND gates, capacitors, diodes and transistors, a known binary counter 572, four AND gates A9, A10, A11 and A12, three OR gates A13, A14 and A15, four resistors R22, R23, R24 and R25, and four transistors Tr15, Tr16, Tr17 and Tr18.

As in the flicker device 540 of FIG. 22, the oscillation circuit 570 and the binary counter 572 of the flicker device 584 supply output signals Q1 and Q1 and Q2 and Q2, respectively, to the AND gates A9 through A12, whereupon the terminals 574 through 580, connected to the OR gates A13 through A15 and AND gate A12, conduct successively and cumulatively. Consequently, the first to fourth lamps light successively and cumulatively, so that the arrow projected thereby gives a flowing impression to the eye.

Figure 27:
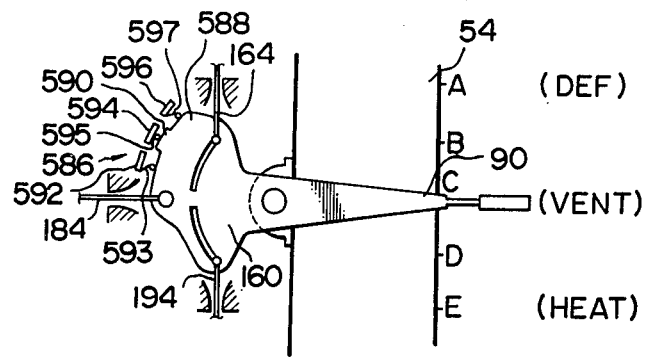
FIG. 27 is a view illustrating an outlet duct selection switch of a fifth embodiment of this invention.

Next, a fifth embodiment of this invention will be described by reference to FIG. 27. This embodiment shows a modification of the outlet duct selection switch 200 attached to the outlet duct selection lever 90 shown in FIGS. 9 and 10.

An outlet duct selection switch 586 comprises microswitches 592, 594 and 596 that close on coming in contact with a projection 590 of a cam 588 integrally formed with the link plate 160 of said discharge port selection lever 90. The microswitch 592 closes when the outlet duct selection lever 90 is in "DEF" indication position A and in intermediate position B between "DEF" indicating position A and "VENT" indicating position C. The microswitch 594 closes in said intermediate position B, "VENT" indicating position C, and intermediate position D between "VENT" indicating position C and "HEAT" indicating position E. The microswitch 596 closes in said intermediate position D and "HEAT" indicating position E. The microswitches open and close enclosed provided contacts with individual contact segments 593, 595 and 597. The positive-side terminals of said microswitches connect with the power supply 262, via the first terminal 253 of the air change-over switch 202 shown in FIG. 10. The negative-side terminals of the microswitches 592, 594 and 596 connect with the "DEF," "VENT," and "HEAT" lamp groups, respectively.

The use of the microswitches in this embodiment keeps the contacts from exposure, whereby worsening of the contacts' conduction due to adhesion of dusts can be prevented and their durability improved.

Figure 28:
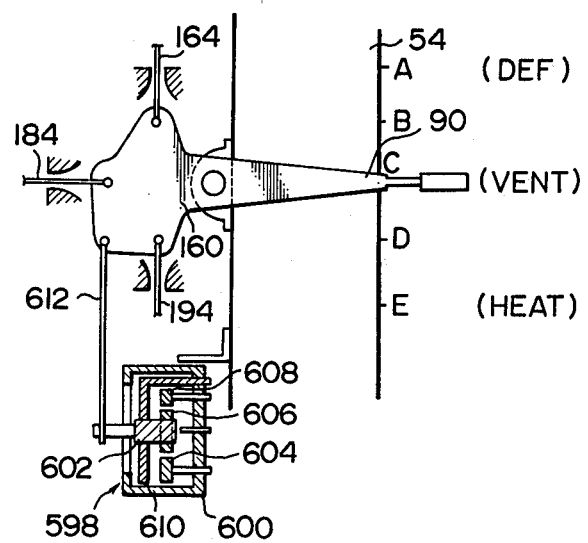
FIG. 28 is a view illustrating an outlet duct selection switch of a sixth embodiment of this invention.

A sixth embodiment of this invention will be described by reference to FIG. 28. This embodiment shows another embodiment of the outlet duct selection switch 200 attached to the outlet duct selection lever 90 shown in FIGS. 9 and 10.

An enclosed-type outlet duct selection switch 598 comprises a slider 602 sealed in a box 600 attached to said operating panel 54 and first to fourth electrodes 604, 606, 608 and 610. The slider 602, made of electric conductor, connects through a flexible wire 612 with the link plate 160 of the outlet duct selection lever 90. When the outlet duct selection lever 90 is in "DEF" indicating position A, only the first electrode 604 conducts with the fourth electrode 610. In intermediate position B between "DEF" indicating position A and "VENT" indicating position C, the first and second electrodes 604 and 606 conduct with the fourth electrode 610. In "VENT" indicating position C, only the second electrode 606 conducts with the fourth electrode 610. In intermediate position D between "VENT" indicating position C and "HEAT" indicating position E, the second and third electrodes 606 and 608 conduct with the fourth electrode 610. And in "HEAT" indicator position E, only the third electrode 608 conducts with the fourth electrode 610.

The fourth electrode 610 connects through the first terminal 253 of the air change-over switch 202, shown in FIG. 10, with the power supply 262, the first electrode 604 with the "DEF" lamp group, the second electrode 606 with the "VENT" lamp group, and the third electrode 608 with the HEAT" lamp group.

Employing the enclosed-type outlet duct selection switch 598 sealed in the box 600, this embodiment also achieves the same operation and result as the fifth embodiment described before.

Figure 29:
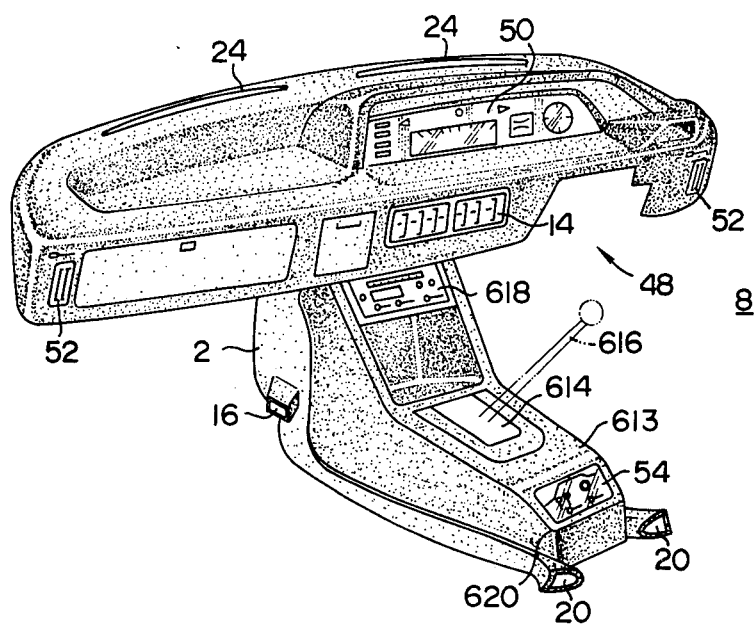
FIG. 29 is a schematic view of an operating panel of a seventh embodiment of this invention.

Now a seventh embodiment of this invention will be described by reference to FIG. 29. This embodiment relates to arrangement of the operating panel 54.

Reference numeral 613 designates a central console extending from the center of the instrument panel 48 provided in the front portion of the cabin 8 toward the rear protion thereof. A shift lever 616 projects from an opening 614 formed therein, a radio 618 and other units are suitably disposed, and the operating panel 54 is inlaid in a rear top portion 620 of said central console 613.

According to this embodiment, not only the driver but also a passenger in the rear seat can readily control the air conditioner proper 2 through the operating panel 54 and also perceive and confirm the operating condition thereof with ease.

Figure 30:
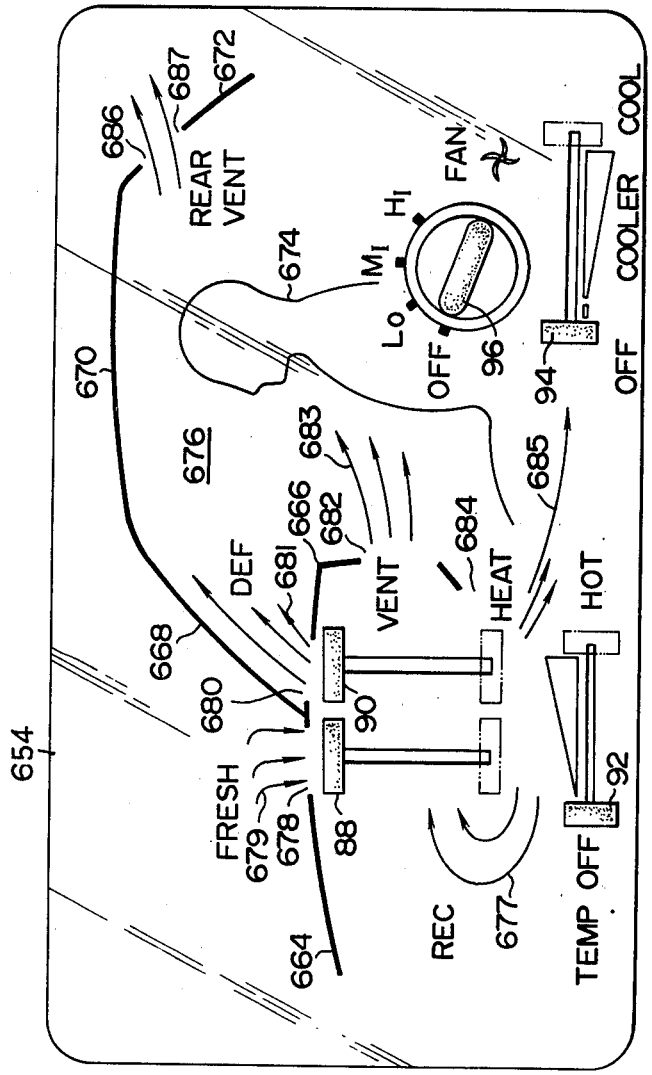
FIG. 30 is a schematic view of an operating panel of an eighth embodiment of this invention.

Next, an eighth embodiment of this invention will be described by reference to FIG. 30. On the surface of an operating panel 654 of this embodiment is sketched the outline of car body, comprising a front bonnet 664, an instrument panel 666, a front window 668, a roof 670 and a rear window 672, together with a passenger 674 and a cabin 676, in such a way as to be distinguishable at a look. The front bonnet 664 has a break 678 designating a port to introduce external air from outside, with letters "FRESH" and arrows 679 given thereabove. Letters "REC" and arrows 677 to indicate the introduction and recirculation of internal air are given in the cabin 676. A break 680, letters "DEF" and arrows 681 to indicate the supply of air along the internal surface of the front window 668 are given above the instrument panel 666. An opening 682, together with letters "VENT" and arrows 683, for discharging air against the face of the pas-666. Below the instrument panel 666 is shown a break 684 designating a port to supply air against the feet of the passenger 674, with letters "HEAT" and arrows 685. A break 686 designating a port to discharge internal air outside is provided in the rear window 672, together with letters "REAR VENT" and arrows 678. All of them make up indicating means corresponding to said component elements of the air conditioner proper 2.

Reference numeral 88 denotes an air change-over lever slidable between said letters "FRESH" and "REC," 90 a outlet duct selection lever slidable between said letters "DEF," "VENT," and "HEAT," 92 a warm air conrol lever slidable between letters "OFF" and "HOT," 94 a cool air control lever slidable between letters "OFF" and "COOL," and 96 a fan switch to control the speed of the fan in positions "OFF," "LO," "MI," and "HI." Said levers and fan switch make up control means.

By simply setting the control levers etc. to the indications or letters on the operating panel 654 of this embodiment, the air conditioner proper 2 operates accordingly. Therefore, this embodiment provides an operating panel that is very cheap, but achieves the same effect as the first embodiment described previously does.

As in the case of the first embodiment, it is effective for the improvement of maneuverability to light the operating panel with a lamp during the night.

TABLE 1

| working conditions | air change-over lever 88 / warm air detecting switch 204 / cool air detecting switch 206 indications | FRESH (F) OFF OFF | FRESH (F) OFF COOL | FRESH (F) HOT OFF | FRESH (F) HOT COOL | (G) OFF OFF | (G) OFF COOL | (G) HOT OFF | (G) HOT COOL | REC (H) OFF OFF | REC (H) OFF COOL | REC (H) HOT OFF | REC (H) HOT COOL |
|---|---|---|---|---|---|---|---|---|---|---|---|---|---|
| fan switch; OFF car; stopping | FRESH | — | — | — | — | — | — | — | — | — | — | — | — |
|  | REAR VENT | — | — | — | — | — | — | — | — | — | — | — | — |
|  | REC | — | — | — | — | — | — | — | — | — | — | — | — |
| fan switch; ON car; stopping | FRESH | L | L | R | L/R | L | L | R | L/R | — | — | — | — |
|  | REAR VENT | L | L | R | L/R | L | L | R | L/R | — | — | — | — |
|  | REC | — | — | — | — | L | L | R | L/R | L | L | R | L/R |
| fan switch; OFF car; running at a speed above 10 km/h | FRESH | L | L | R | L/R | L | L | R | L/R | — | — | — | — |
|  | REAR VENT | L | L | R | L/R | L | L | R | L/R | — | — | — | — |
|  | REC | — | — | — | — | L | L | R | L/R | L | L | R | L/R |
| fan switch; ON car; running at a speed above 10 km/h | FRESH | L | L | R | L/R | L | L | R | L/R | — | — | — | — |
|  | REAR VENT | L | L | R | L/R | L | L | R | L/R | — | — | — | — |
|  | REC | — | — | — | — | L | L | R | L/R | L | L | R | L/R |

Note 1: 'L' designates the lighting of a blue lamp and 'R' does that of a red lamp.
Note 2: 'L/R' designates the lighting of both blue and red lamps.
Note 3: '—' means that no lamp is alight.

TABLE 2

| working conditions | outlet duct selection lever 90 | DEF (A) | | | | (B) | | | | VENT (C) | | | | (D) | | | | HEAT (E) | | | |
|---|---|---|---|---|---|---|---|---|---|---|---|---|---|---|---|---|---|---|---|---|---|
| | warm air detecting switch 204 | OFF | | HOT | | OFF | | HOT | | OFF | | HOT | | OFF | | HOT | | OFF | | HOT | |
| | cool air detecting switch 206 indications | OFF | COOL | OFF | COOL | OFF | COOL | OFF | COOL | OFF | COOL | OFF | COOL | OFF | COOL | OFF | COOL | OFF | COOL | OFF | COOL |
| fan switch OFF | DEF | — | — | — | — | — | — | — | — | — | — | — | — | — | — | — | — | — | — | — | — |
| car; stopping fan switch ON | VENT | — | — | — | — | — | — | — | — | — | — | — | — | — | — | — | — | — | — | — | — |
| | HEAT | — | L | — | R | — | L | — | R | — | L | — | — | — | L | — | L | — | L | — | R |
| | DEF | L | — | R | L/R | L | — | R | L/R | — | — | — | — | L | — | L | L/R | L | — | R | L/R |
| car; stopping fan switch OFF | VENT | — | — | — | — | — | — | — | — | — | — | — | — | — | — | — | — | — | — | — | — |
| | HEAT | — | L | — | R | — | L | — | R | — | L | — | — | — | L | — | L | — | L | — | R |
| | DEF | L | — | R | L/R | L | — | R | L/R | — | — | — | — | L | — | L | L/R | L | — | R | L/R |
| car; running at a speed above 10 km/h fan switch ON | VENT | — | — | — | — | — | — | — | — | — | — | — | — | — | — | — | — | — | — | — | — |
| | HEAT | — | L | — | R | — | L | — | R | — | L | — | — | — | L | — | L | — | L | — | R |
| | DEF | L | — | R | L/R | L | — | R | L/R | — | — | — | — | L | — | R | L/R | L | — | R | L/R |
| car; running at a speed above 10 km/h fan switch OFF | VENT | — | — | — | — | — | — | — | — | — | — | — | — | L | — | L | — | L | — | L | — |
| | HEAT | — | L | — | R | — | L | — | R | L | — | L | — | L | — | R | L/R | L | — | R | L/R |

Note 1: 'L' designates the lighting of a blue lamp and 'R' does that of a red lamp.
Note 2: 'L/R' designates the lighting of both blue and red lamps.
Note 3: '—' means that no lamp is alight.

TABLE 3

| working conditions | air change-over lever 88 / warm air detecting switch 204 / cool air detecting switch 206 indications | FRESH (F) OFF OFF | FRESH (F) OFF COOL | FRESH (F) HOT OFF | FRESH (F) HOT COOL | (G) OFF OFF | (G) OFF COOL | (G) HOT OFF | (G) HOT COOL | REC (H) OFF OFF | REC (H) OFF COOL | REC (H) HOT OFF | REC (H) HOT COOL |
|---|---|---|---|---|---|---|---|---|---|---|---|---|---|
| fan switch; OFF car; stopping | FRESH | L | L | R | L/R | L | L | R | L/R | — | — | — | — |
| | REAR VENT | L | L | R | L/R | L | L | R | L/R | — | — | — | — |
| | REC | — | — | — | — | L | L | R | L/R | L | L | R | L/R |
| fan switch; ON car; stopping | FRESH | L | L | R | L/R | L | L | R | L/R | — | — | — | — |
| | REAR VENT | L | L | R | L/R | L | L | R | L/R | — | — | — | — |
| | REC | — | — | — | — | L | L | R | L/R | L | L | R | L/R |
| fan switch; OFF car; running at a speed of above 10 km/h | FRESH | L | L | R | L/R | L | L | R | L/R | — | — | — | — |
| | REAR VENT | L | L | R | L/R | L | L | R | L/R | — | — | — | — |
| | REC | — | — | — | — | L | L | R | L/R | L | L | R | L/H |
| fan switch; ON car; running at a speed of above 10 km/h | FRESH | L | L | R | L/R | L | L | R | L/R | — | — | — | — |
| | REAR VENT | L | L | R | L/R | L | L | R | L/R | — | — | — | — |
| | REC | — | — | — | — | L | L | R | L/R | L | L | R | L/R |

Note 1: 'L' designates the lighting of a blue lamp and 'R' does that of a red lamp.
Note 2: 'L/R' designates the lighting of both blue and red lamps.
Note 3: '—' means that no lamp is alight.

TABLE 4

| working conditions | outlet duct selection lever 90 | warm air detecting switch 204 | cool air detecting switch 206 indications | DEF (A) ||||||| (B) ||||||| VENT (C) ||||||| (D) ||||||| HEAT (E) |||||||
|---|---|---|---|---|---|---|---|---|---|---|---|---|---|---|---|---|---|---|---|---|---|---|---|---|---|---|---|---|---|---|---|---|---|---|
| | | | | OFF ||| COOL ||| HOT ||| OFF ||| COOL ||| HOT ||| OFF ||| COOL ||| HOT ||| OFF ||| COOL ||| HOT ||| OFF ||| COOL ||| HOT |||
| | | | | OFF | COOL | HOT | OFF | COOL | HOT | OFF | COOL | HOT | OFF | COOL | HOT | OFF | COOL | HOT | OFF | COOL | HOT | OFF | COOL | HOT | OFF | COOL | HOT | OFF | COOL | HOT | OFF | COOL | HOT |
| fan switch; OFF | DEF | | | L | L | R | L/R | L | L | R | L/R | | | | | | | | | | | | | | | | | | | | | | | |
| car; stopping fan switch; ON | VENT | | | — | — | — | — | L | L | L | L | L | L | R | L | L | L | L | — | — | — | L | L | L | R | L | L | L | — | — | — | L | L | R | L/R |
| | HEAT | | | — | — | — | L | — | R | L/R | — | — | R | L/R | — | — | — | — | — | — | — | L | R | L/R | — | L | R | — |
| | DEF | | | L | L | R | L/R | L | L | R | L/R | L | L | R | L/R | — | — | — | L | L | L | R | L | L | L | L | L | L | L | L | R | — |
| car; stopping fan switch; OFF | VENT | | | — | — | — | — | L | L | L | L | | | L | L | | | | | | | | | | | | | | | | | | | | |
| | HEAT | | | — | — | — | L | — | R | L/R | L | — | R | L/R | L | — | — | — | L | L | L | L | R | L | L | L | L | — | L | R | — |
| | DEF | | | — | — | — | — | L | L | L | L | | | | | | | | | | | | | | | | | | | | | | | | |
| car; running at a speed above 10 km/h fan switch; ON | VENT | | | — | — | — | — | L | L | L | L | L | L | L | L | L | L | L | L | L | L | L | L | L | L | L | L | L | L | L | L | — | L | L | — |
| | HEAT | | | — | L | — | R | L/R | L | L | — | R | L/R | L | L | — | — | — | L | L | L | L | R | — | L | L | R | — | L | L | R | L/R | — |
| | DEF | | | | | | | | | | | | | | | | | | | | | | | | | | | | | | | | | | |
| car; running at a speed above 10 km/h fan switch; ON | VENT | | | — | — | — | — | L | L | L | L | L | L | L | L | L | L | L | L | L | L | L | L | L | L | L | L | L | L | L | — | L | L | — |
| | HEAT | | | — | — | — | L | L | L | R | L/R | L | L | L | L | L | L | R | L/R | L | L | L | L | R | L/R | L | L | L | R | L/R |

Note 1: 'L' designates the lighting of a blue lamp and 'R' does that of a red lamp.
Note 2: 'L' designates the lighting of both blue and red lamps.
Note 3: '—' means that no lamp is alight.

What is claimed is:

1. Air conditioner operating apparatus comprising an automotive air conditioner comprising component elements composed of a plurality of air intake ducts and a plurality of air outlet ducts, an operating panel having a sketch corresponding to a cabin in which the air conditioner proper is provided, a plurality of means for indicating the flow of air into and out of the air conditioner proper provided in a plurality of positions on the sketch, control means movable between the plurality of indicating means, operating means actuated by the control means through connecting means to control the component elements, and said connecting means.

2. Air conditioner operating apparatus according to claim 1, which comprises component elements composed of an external air intake duct, an internal intake duct, a "DEF" outlet duct to discharge air along the internal surface of the front window, a "HEAT" outlet duct to discharge air toward the lower portion of the cabin, a heater core, and a fan to forcibly discharge air from the outlet ducts.

3. Air conditioner operating apparatus according to claim 2, which comprises operating means comprising a first damper valve to perform change-over between the external air and internal air intake ducts, a second damper valve to perform change-over between the "DEF" and "HEAT" outlet ducts, a regulating valve to control the flow rate of hot water supplied to the heater core, and a fan motor to drive the fan.

4. Air conditioner operating apparatus according to claim 3, which comprises control means comprising an air change-over lever to actuate the first damper, an outlet duct selection lever to actuate the second damper valve, and a fan switch, and connecting means comprising a first connecting cable to connect the air change-over lever with the first damper valve, a second connecting cable to connect the outlet duct selection lever with the second damper valve, and an electric wire to connect the fan switch with the fan motor.

5. Air conditioner operating apparatus according to claim 4, which comprises air change-over indicating means and outlet duct selection indicating means on the sketch corresponding to the cabin, and control means comprising an air change-over lever that is movable along said air change-over indicating means and an outlet duct selection lever that is movable along said outlet duct selection indicating means.

6. Air conditioner operating apparatus according to claim 5, wherein said indicating means are made up of letters.

7. Air conditioner operating apparatus according to claim 5, wherein said indicating means are made up of arrows corresponding to the flow of air into and out of the air conditioner proper.

8. Air conditioner operating apparatus according to claim 7, wherein each of said arrows comprises a plurality of narrow arrows.

9. Air conditioner operating apparatus according to claim 7, wherein each of said arrows is a wide, elongated arrow.

10. Air conditioner operating apparatus according to claim 5, wherein said indicating means comprise letters designating the flow of air into and out of the air conditioner proper and arrows corresponding to said air-flow provided in the vicinity of said letters.

11. Air conditioner operating apparatus according to claim 1, which comprises an air conditioner proper comprising component elements composed at least of an external air intake duct, an internal intake duct, a "DEF" outlet duct to discharge air along the internal surface of the front window, a "HEAT" outlet duct to discharge air to the lower portion of the cabin, a heater core, and a fan to forcibly discharge air from said outlet ducts, indicating means comprising external air intake indicating means, which comprises letters "FRESH" and an arrow to indicate the intake of air into the external air intake duct of the air conditioner proper, recirculation indicating means, which comprises letters "REC" and an arrow to indicate the intake of internal air into the internal air intake duct and recirculation thereof inside the cabin, "DEF" indicating means, which comprises letters "DEF" and an arrow to indicate the discharge of air from the "DEF" outlet duct, and "HEAT" indicating means, which comprises letters "HEAT" and an arrow to indicate the discharge of air from the "HEAT" outlet duct, control means comprising an air change-over lever movable between the vicinities of the external air intake and recirculation indicating means, an outlet duct selection lever movable between the vicinities of the "DEF" and "HEAT" indicating means, and a fan switch, and operating means comprising a first operating cable and an air change-over damper valve actuated through the first operating cable by the air change-over lever to perform change-over between the external air and internal air intake ducts, a second operating cable and a "DEF" damper valve actuated through the second operating cable by the outlet duct selection lever to open and close the "DEF" outlet duct, a "HEAT" damper valve actuated through the second operating cable by the outlet duct selection lever to open and close the "HEAT" outlet duct, an electric wire and a fan motor actuated by the fan switch connected by the electric wire to the fan motor.

12. Air conditioner operating apparatus according to claim 11, wherein light-emitting means to illuminate the operating panel is provided thereto.

13. Air conditioner operating apparatus according to claim 1, which comprises an air conditioner proper comprising component elements composed of an external air intake duct, an internal air intake duct, a "DEF" outlet duct to discharge air along the internal surface of the front window, a "VENT" outlet duct to discharge air against the face of the driver, a "HEAT" outlet duct to discharge air to the lower portion of the cabin, a "HEAT/R" outlet duct to discharge air to the leg room of the rear seat passenger, a heater core, a fan to forcibly supply air to said outlet ducts, and a cooler core provided in said internal air intake duct, indicating means comprising an operating panel drawn with a sketch of the car-body outline, instrument panel and driver corresponding to the cabin in which said air conditioner proper is disposed, external air intake indicating means, which comprises letters "FRESH" and an arrow to indicate the intake of air into the external air intake duct of the air conditioner proper, recirculation indicating means, which comprises letters "REC" and an arrow to indicate the intake of internal air into the internal air intake duct and recirculation thereof inside the cabin, "DEF" indicating means, which comprises letters "DEF" and an arrow to indicate the discharge of air from the "DEF" outlet duct, "VENT" indicating means, which comprises letters "VENT" and an arrow to indicate the discharge of air from the "VENT" outlet duct, and "HEAT" indicating means, which comprises letters "HEAT" and an arrow to indicate the discharge of air from the "HEAT" and "HEAT/R" outlet ducts, control means comprising an air change-over lever movable between the vicinities of the external air intake and recirculation indicating means, an outlet duct selection lever movable between the vicinities of the "DEF" and "HEAT" indicating means via the "VENT" indicating means, a fan switch provided on the operating panel, a warm air control lever on the operating panel, and a cool air control lever on the operating panel, and operating means comprising an air change-over damper valve actuated through a first operating cable by the air changeover lever to perform change-over between the external air and internal air intake ducts, a "DEF" damper valve provided in the "DEF" outlet duct, a "VENT" damper valve provided in the "VENT" outlet duct and a "HEAT" damper valve provided in the "HEAT" outlet duct, said damper valves being actuated through a second operating cable by the outlet duct selection lever, a fan motor actuated through an electric wire by the fan switch, a regulating valve to control the quantity of engine cooling water supplied to the heater core by the operation of the warm air control lever, and a regulating valve to control the quantity of refrigerant supplied to the cooler core by the operation of the cool air control lever.

14. Air conditioner operating apparatus according to claim 1, wherein light-emitting means to illuminate the operating panel is provided thereto.

15. Air conditioner operating apparatus according to claim 1, wherein light-emitting means connected to a switch attached to control means is provided to the operating panel so that said light-emitting means lights to illuminate said indicating means in accordance with the operation of said control means.

16. Air conditioner operating apparatus according to claim 1, wherein light-emitting means connected to a switch attached to control means is provided to the operating panel so that said light-emitting means lights to illuminate said indicating means comprising arrows in accordance with the operation of said control means.

17. Air conditioner operating apparatus according to claim 1, wherein said operating panel comprises a transparent plate drawn with a sketch of, at least, the cabin, a semi-transparent plate, a shielding plate provided with arrow-shaped openings in positions corresponding to the flow of air into and out of the air conditioner proper on said cabin sketch, and a base plate provided with light-emitting means, from the surface in that order, so that light emitted by said light-emitting means passes through the arrow-shaped openings in the shielding plate and the semi-transparent plate to project arrows constituting indicating means on the transparent plate.

18. Air conditioner operating apparatus according to claim 17, wherein light-emitting means illuminating an arrow constituting one indicating means is separated from the other light-emitting means by a partition so that only an arrow corresponding to the operation of said control means is projected by lighting said light-emitting means by operating a switch attached to said control means.

19. Air conditioner operating apparatus according to claim 18, wherein said light-emitting means to project said arrows are connected to a dimmer so that luminance of said light-emitting means is varied.

20. Air conditioner operating apparatus according to claim 18, wherein at least one of said light-emitting means to project said arrows is a flicker cathode glow lamp connected to an A.C. power supply.

21. Air conditioner operating apparatus according to claim 18, wherein at least one of said light-emitting means to project said arrows is made up of a plurality of light-emitting means connected to a flicker device that successively and repeatedly turns on and off the plurality of light-emitting means in the direction of the arrow, giving an impression of a moving lighting point.

22. Air conditioner operating apparatus according to claim 18, wherein at least one of said light-emitting means to project said arrows is made up of a plurality of light-emitting means connected to a flicker device that successively and repeatedly turns on and off the plurality of light-emitting means in the direction of the arrow, giving an impression of a moving dark point.

23. Air conditioner operating apparatus according to claim 18, wherein at least one of said light-emitting means to project said arrows is made up of a plurality of light-emitting means disposed along the arrow, and a flicker device to successively light the plurality of light-emitting means in the direction of the arrow is provided.

24. Air conditioner operating apparatus according to claim 18, wherein two light-emitting means, one being of warm color and the other of cool color, are provided to project an arrow constituting each indicating means, and a detecting switch, lighting the cool-color light-emitting means when cool air flows out of the corresponding outlet duct and the warm-color light-emitting means when warm air flows therefrom, is provided to the control means.

25. Air conditioner operating apparatus according to claim 18, wherein red and blue light-emitting means are provided to project an arrow constituting each indicating means, and a detecting switch, lighting the blue light-emitting means when cool air flows from the corresponding outlet duct, the red light-emitting means when warm air flows therefrom, and both light-emitting means when a mixture of warm and cool air flows therefrom, is provided to the control means.

26. Air conditioner operating apparatus according to claim 18, wherein orange and green light-emitting means project an arrow constituting each indicating means, and a detecting switch, lighting the green light-emitting means when cool air flows from the corresponding outlet duct, the orange light-emitting means when warm air flows therefrom, and both light-emitting means when a mixture of warm and cool air flows therefrom, is provided to the control means.

27. Air conditioner operating apparatus according to claim 18, wherein a car-speed detecting switch that closes when the car-speed exceeds a given level and a detecting switch interlocked with a fan switch actuating a fan in the air conditioner proper are connected in parallel, and also to said light-emitting means.

28. Air conditioner operating apparatus according to claim 18, wherein a light-dimming circuit is provided, said light-dimming circuit being connected to a lighting switch to turn on and off headlights, cornering and other lights and reducing luminance of said light-emitting means when said lighting switch closes.

29. Air conditioner operating apparatus according to claim 18, wherein said light-emitting means are connected to a switch interlocked with the ignition key switch of the car.

30. Air conditioner operating apparatus according to claim 17, wherein letters corresponding to the flow of air into and out of the air conditioner proper are given in positions corresponding to said air-flow on the cabin-sketch on said transparent plate.

31. Air conditioner operating apparatus according to claim 1, wherein said operating panel is disposed in the instrument panel.

32. Air conditioner operating apparatus according to claim 1, wherein said operating panel is disposed in the console box between the driver and assistant-driver seats.

* * * * *